(12) United States Patent
Reistad et al.

(10) Patent No.: US 7,676,562 B2
(45) Date of Patent: Mar. 9, 2010

(54) COMPUTER SYSTEM FOR ACCESSING INSTRUMENTATION INFORMATION

(75) Inventors: Brian J. Reistad, Redmond, WA (US); Raymond W. McCollum, Redmond, WA (US); Alan S. Geller, Redmond, WA (US); Paul Allen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 10/917,074

(22) Filed: Aug. 12, 2004

(65) Prior Publication Data

US 2005/0182843 A1 Aug. 18, 2005

Related U.S. Application Data

(60) Provisional application No. 60/537,637, filed on Jan. 20, 2004.

(51) Int. Cl.
*G06F 15/173* (2006.01)
(52) U.S. Cl. ...................... 709/223; 709/224
(58) Field of Classification Search .............. 709/223, 709/224
See application file for complete search history.

(56) References Cited

U.S. PATENT DOCUMENTS

| | | | |
|---|---|---|---|
| 6,493,719 B1 | 12/2002 | Booth et al. | |
| 6,681,244 B1 * | 1/2004 | Cross et al. | 709/203 |
| 6,973,659 B2 * | 12/2005 | Smith et al. | 719/330 |
| 7,136,913 B2 * | 11/2006 | Linderman | 709/223 |
| 7,289,480 B2 * | 10/2007 | Lundstrom et al. | 370/338 |
| 7,305,463 B2 * | 12/2007 | Kaneda et al. | 709/223 |
| 7,349,980 B1 * | 3/2008 | Darugar et al. | 709/238 |
| 7,392,391 B2 * | 6/2008 | Eibach et al. | 713/175 |
| 2002/0016911 A1 * | 2/2002 | Chawla et al. | 713/153 |
| 2002/0062381 A1 * | 5/2002 | Gargiulo et al. | 709/228 |
| 2002/0165973 A1 * | 11/2002 | Ben-Yehezkel et al. | 709/230 |
| 2003/0014368 A1 * | 1/2003 | Leurig et al. | 705/64 |
| 2003/0018764 A1 * | 1/2003 | Shell et al. | 709/223 |
| 2003/0135628 A1 | 7/2003 | Fletcher et al. | |
| 2004/0024837 A1 * | 2/2004 | Keesey et al. | 709/213 |
| 2004/0029598 A1 * | 2/2004 | Guggisberg | 455/466 |
| 2004/0059810 A1 | 3/2004 | Chess et al. | |

(Continued)

FOREIGN PATENT DOCUMENTS

WO   WO 02/01833 A1   1/2002

(Continued)

OTHER PUBLICATIONS

Don Box et al., Simple Object Access Protocol (SOAP) 1.1, published W3C Note on May 8, 2000.*

(Continued)

*Primary Examiner*—Nathan Flynn
*Assistant Examiner*—Jeong S Park

(57) ABSTRACT

To maintain and manage a computer network, a system administrator may monitor a large number and variety of components, each component comprising a variety of resources. The instrumentation of a resource may be monitored and/or manipulated by receiving a Simple Object Accessing Protocol (SOAP) message comprising an operation identifier for accessing instrumentation information and a resource identifier associated with a computer system resource. The management system may resolve the resource identifier into an address for a local handler associated with the resource, and may send a local request to the local handler at the resolved address.

18 Claims, 5 Drawing Sheets

U.S. PATENT DOCUMENTS

2004/0059940 A1 3/2004 Birk et al.

FOREIGN PATENT DOCUMENTS

WO WO 2004/027553 A2 4/2004

OTHER PUBLICATIONS

RFC 1945 Hyper Transfer Protocol HTTP/1.0, T. Berners, published on May 1996.*

U.S. Appl. No. 10/692,432, filed Oct. 23, 2003, Reistad et al.

Ballinger, K., et al., "Basic Profile Version 1.0," *The Web Services-Interoperability Organization (WS-I)*, Apr. 16, 2004, <http://www.ws-i.org/Profiles/BasicProfile-1.0-2001-04-16.html> [retrieved Aug. 10, 2004].

Box, D., et al., "Web Services Addressing (WS-Addressing)," Aug. 2004, <http://msdn.microsoft.com/webservices/understanding/specs/default.aspx?pull=/library/en-us/dnglobspec/html/ws-addressing.asp> [retrieved Aug. 10, 2004].

Berners-Lee, T., et al., "Uniform Resource Identifiers (URI): Generic Syntax," *Network Working Group Request for Comments: 2396*, Aug. 1998, pp. 1-40, <http://www.ietf.org/rfc/rfc2396.txt> [retrieved Aug. 11, 2004].

Christensen, E., et al., "Web Services Description Language (WSDL) 1.1", *W3C Note*, Mar. 15, 2001, <http://www.w3org/TR/wsdl> [retrieved Aug. 11, 2004].

Cisco Systems, Inc., "Simple network management protocol (SNMP) Documentation," Feb. 20, 2002, <http://www.cisco.com/univercd/cc/td/doc/cisintwk/ito_doc/snmp.htm> [retrieved Aug. 10, 2004].

Craft, Daniel H., "Resource Management in a Decentralized System," *ACM Symposium on Op. Sys. Princ.*, 1983, pp. 11-19.

Gudgin, M., et al., "SOAP 1.2: Part 1, Messaging Framework," *W3C Recommendation*, Jun. 24, 2003, <http://www.w3org.TR/soap12-part1/> [retrieved Aug. 12, 2004].

Gudgin, M., et al., "SOAP 1.2: Part 2 Adjuncts," *W3C Recommendation*, Jun. 24, 2003, <http://www.w3org/TR/soap12-part2/> [retrieved Aug. 12, 2004].

Kuznetsov, E., "XML in Unexpected Places," *XML-Journal*, 2004, http://www.sys-con.com/xml/articleprint.cfm?id=739 [retrieved Aug. 11, 2004].

Pratten, A.W., et al., "Design and Implementation of a Trader-Based Resource Management System," *Conf. Centre for Adv. Studies on Collaborative Research*, Oct. 1994.

Westerinen, A., et al., "The Continuing Evolution of Distributed Systems Management," *IEICE Trans. Inf. & Syst* E86-D(11):2256-2261, Nov. 2003.

Westerinen, A., et al., "CIM/WBEM Tutorial," *SAF Presentation, DMTF© 2003*, Plano, Texas, Nov. 18, 2003.

* cited by examiner

```
(1)     <?xml version="1.0"?>
(2)     <env:Envelope                    302
(3)        xmlns:env="http://www.w3.org/2003/05/soap-envelope"
(4)        xmlns:wmx="http://schemas.xmlsoap.org/ws/2004/06/wmx"
(5)        xmlns:wsa="http://schemas.xmlsoap.org/ws/2003/03/addressing">
(6)
(7)     <env:Header>           304
(8)       <wsa:To env:mustUnderstand="true">
(9)          https://1.2.3.4/wmx                              308
(10)      </wsa:To>
(11)
(12)     <wsa:Action env:mustUnderstand="true">
(13)        http://schemas.xmlsoap.org/ws/2004/01/transfer/Get    310
(14)     </wsa:Action>
(15)
(16)     <wsa:MessageID env:mustUnderstand="true">
(17)        uuid:d9726315-bc91-430b-9ed8-ce5ffb858a87
(18)     </wsa:MessageID>                                         312
(19)
(20)     <wmx:ResourceURI env:mustUnderstand="true">
(21)        wmx:microsoft.os.storage.disks/Drives/diskInfo?drive=c:diskInfo
(22)     </wmx:ResourceURI>
(23)     <wmx:Timeout> PT30S </wmx:Timeout>
(24)
(25)     </env:Header>
(26)
(27)     <env:Body/>
(28)                    306
(29)     </env:Envelope>
```

*Figure 3*

```
(1)
(2)     <?xml version="1.0"?>
(3)     <env:Envelope                 402
(4)        xmlns:env="http://www.w3.org/2003/05/soap-envelope"
(5)        xmlns:wmx="http://schemas.xmlsoap.org/ws/2004/06/wmx"
(6)        xmlns:wsa="http://schemas.xmlsoap.org/ws/2003/03/
addressing">
(7)
(8)     <env:Header>                  404
(9)       <wsa:From>                  408
(10)        <wsa:Address>  http://1.2.3.4/wmx </wsa:Address>
(11)        <wsa:ReferenceProperties>
(12)          <wmx:ResourceURI>
(13)            wmx:microsoft.os.storage.disks/Drives/
diskInfo?drive=c:
(14)          </wmx:ResourceURI>
(15)        </wsa:ReferenceProperties>
(16)      </wsa:From>                                 410
(17)      <wsa:Action env:mustUnderstand="true">
(18)         http://schemas.xmlsoap.org/ws/2004/01/transfer/
GetResponse
(19)      </wsa:Action>
(20)                                  414
(21)      <wsa:RelatesTo >
(22)         uuid:d9726315-bc91-430b-9ed8-ce5ffb858a87
(23)      </wsa:RelatesTo>
(24)                                  412
(25)      <wsa:MessageId>
(26)         uuid:f9726325-aa90-120b-6ed2-ae5ffb223a81
(27)      </wsa:MessageId>
(28)    </env:Header>
(29)                                  406
(30)    <env:Body>
(31)      <DiskInfo
(32)         xmlns=http://schemas.com/2004/06/diskinfo">
(33)         <Drive> C: </Drive>
(34)         <TotalCapacity> 12000000000 </TotalCapacity>
(35)         <FreeSpace> 802012911 </FreeSpace>
(36)         <FileSystem> NTFS </FileSystem>
(37)         <VolumeLabel> MyCDrive </VolumeLabel>
(38)      </DiskInfo>
(39)    </env:Body>
(40)    </env:Envelope>
```

COMPUTER SYSTEM FOR ACCESSING INSTRUMENTATION INFORMATION

RELATED APPLICATIONS

This application is a continuation of and claims priority to U.S. provisional patent application having an application Ser. No. 60/537,637, filed Jan. 20, 2004, and entitled SYSTEM PROTOCOL FOR USING URI FOR COMPUTER MANAGEMENT, the entire contents of which is expressly incorporated herein by reference.

FIELD OF THE INVENTION

This application is directed to computer communication protocols, and more particularly, to computer communication protocols for managing resource instrumentation.

BACKGROUND OF THE INVENTION

Distributed and networked computer systems typically comprise a variety of types and sizes of components such as routers, gateways, servers, databases, personal computers, and the like. Each component may include a variety of resources including hardware and software resources such as disk drives, fans, memory allocation, and the like. To manage and maintain the effective use of these components, a systems administrator may monitor the health and other computer system management information of the resource, and modify that information if necessary or otherwise take corrective action. To monitor the system information, the systems administrator may communicate with the desired resource either receiving broadcast messages of status and health information and/or requesting specific information from a defined port. The format of the messages containing the health and/or status information may be controlled by one of several standard protocols which define the format of messages presenting status information from certain devices. For example, Simple Network Management Protocol (SNMP) is a Transmission Control Protocol/Internet Protocol (TCP/IP) standard that is used to manage and control IP gateways and the networks to which they are attached. In another example, SYSLOG is a distributed interface standard for logging short text messages regarding systems health information which are communicated to clients with User Datagram Protocol (UDP) datagrams. In yet anther example, Intelligent Platform Management Interface (IPMI) is a remote management control protocol (RMCP) for request/reply and uses SNMP for events/traps. IPMI is further IPMI data and SNMP data can be mapped into the common information model/Web-based enterprise management (CIM/WBEM)-based standards for retrieving and describing management data over HTTP. In another example, Web Services Distributed Management (WSDM) is a management standard directed toward Webservices.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

To maintain and manage a computer network, a system administrator may monitor a large number and variety of components, each component comprising a variety of resources. Generally, each resource may implement a different standard protocol and/or require a different transport. For example, some server components may accept and generate messages compliant with IPMI, and other components may accept and generate messages compliant with SNMP. Moreover, the messages to and from different resources may be required to be sent over different transports. For example, some messages may require a Hypertext Transfer Protocol (HTTP) transport and other messages from other resources may require a different transport. In this manner, monitoring and maintaining a large and/or heterogeneous computer network may be difficult.

To support various transports for health and/or status information messages, a systems administrator may implement a common message protocol wrapped in a Simple Object Access Protocol (SOAP) envelope. In one example, a client manager may request access to instrumentation information of a particular resource. Accordingly, the client manager may generate a SOAP request message including a resource identifier such as a URI, and an operation identifier indicating the desired operation on the resource, e.g., retrieve desired instrumentation information, change instrumentation/configuration, perform an action on the resource, and the like. The client manager may send the SOAP request to a resource agent associated with the indicated resource. The resource agent may resolve the resource identifier into an address of a local handler, such as an API, of the resource. The resource agent may retrieve the requested instrumentation information or execute the action on the resource through the local handler. The resource agent may then return the instrumentation information, verification of a successful operation, and/or fault message to the client manager, which may be in the form of a SOAP response message.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an example request message of FIG. 1;

FIG. 4 is an example response message of FIG. 1; and

DETAILED DESCRIPTION

Figure 1:
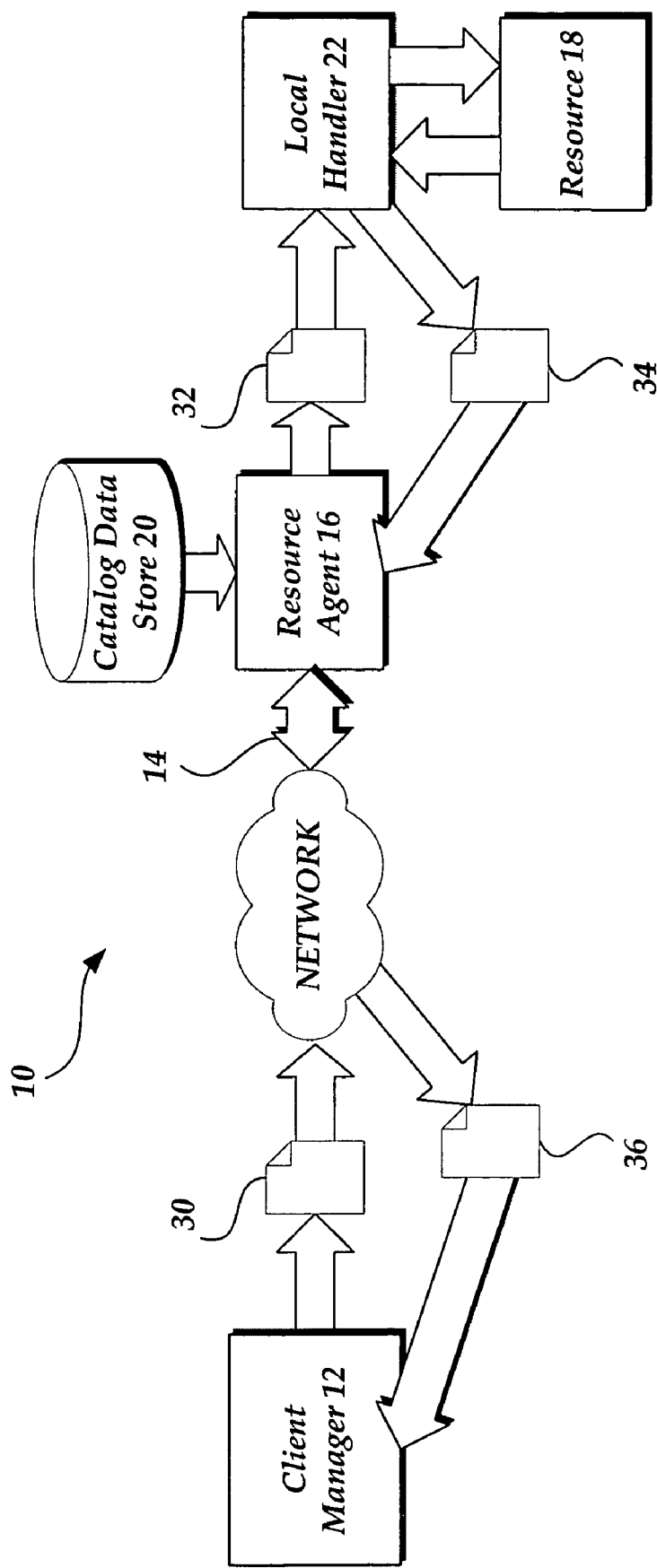
FIG. 1 is an example functional diagram of a management system in accordance with one embodiment.

Various types and sizes of both hardware and software resources may exist in a computer system network. Examples of hardware resources may include network devices, computing devices, and peripheral devices. Example network devices may include routers, gateways, bridges and the like. Example computing devices may include among others, personal computers, workstations, mini-computers, mainframes, and small form devices like palm devices and cellular telephones. Example peripheral devices may include printers, hard disk controllers, magnetic tape drives, plotters, and the like. Software resources may include compilers, editors, debuggers, typesetters, and services such as security services, name services, management services, transaction services, and time services.

Instrumentation is a technique whereby a developer can surface or expose information that is consumable by the administrator and managing a resource. When the resource has been instrumented, objects and events can be discovered, monitored, and configured from diverse data sources. The resource providing the information might be a piece of hardware, operating system, or software application. The information provided by the data source is known as instrumentation. The purpose of instrumentation is very similar to the purpose served by the instrument panel of a car dashboard. Car instrumentation includes gauges, lights and indicators that allow for monitoring information about various resources (such as the fuel gauge) when various events occur (such as the open door alarm). All this instrumentation allows decisions to be made on how the car is driven and maintained. Computer system resources that provide instrumentation may allow management software to diagnose and correct problems in an enterprise computing environment.

As noted above, the various resources of a network may utilize different instrumentation message protocols and/or transport protocols, and may not be compatible with each other. To support various transports for instrumentation information messages, a systems administrator may 'wrap' the message in a Simple Object Access Protocol (SOAP) envelope. SOAP is an Extensible Markup (XML) based protocol used to send messages for invoking methods in a distributed environment. SOAP is described in Gudgin, et al., "SOAP 1.2," W3C Recommendation, Jun. 24, 2003, which is available on the Internet at http://www.w3.org/TR/soap12-part1/ and http://www.w3.org/TR/soap12 -part2/, which is incorporated herein by reference Generally, SOAP is a communication protocol for communication between applications via the Internet.

A SOAP message generally comprises a SOAP envelope element, a SOAP body element, and an optional SOAP header element. The SOAP envelope defines the XML document as a SOAP message with a SOAP envelope element of <soap: Envelope xmls:soap=http://www.w3.org/2001/12/soap-envelope . . . </soap:Envelope>. The SOAP body element contains the actual SOAP message intended for the ultimate endpoint of the message, e.g., the addressee of the message. The SOAP body is delimited by a body element of <soap: Body> . . . </soap:Body>. Generally, the contents of the body element of the SOAP message may be application specific and not part of the SOAP standard. The SOAP header element may contain application specific information, such as authentication, payment, and the like about the SOAP message, with the headers defined by the namespaces listed within the SOAP envelope.

Since SOAP is platform independent, language independent, and transport independent, a SOAP message may be used to encapsulate a request for instrumentation information from any resource. An example of a management system 10 for receiving and sending SOAP instrumentation information messages is shown in FIG. 1. The management system 10 may include a client manager 12 connected to a resource agent 16 through a connection 14. The resource agent 16 communicates with the resource 18 through a local handler 22, such as an application program interface (API) and the like, and may access a catalog data store 20.

Each resource agent 16 may communicate with multiple local handlers 22 to access multiple resources 18 resident on a single component. Accordingly, a system with one or more components may be managed by one or more client managers 12 through one or more resource agents 16, with each resource agent 16 accessing one or more local handlers 22, each local handler being associated with one or more resources 18, as shown in FIG. 1. In one example different resource agents may be associated with different resources, although the resources all reside on a single component, e.g., are hosted by a single server. In this manner, the different resource agents may compartmentalize access to resources on a single component by giving some client managers access to some of the resource agents, and not to other resource agents which may effectively segregate access of resources by different client managers. Alternatively, access to resources may be controlled by verifying access privileges which may be stored in a data store, such as the catalog data store.

The client manager 12 may be provided by any suitable process such as a dedicated application, an automated service, a script, an interactive shell, or any other suitable process. In practice, the client-manager may provide a language-specific library which wraps the SOAP message and/or resource agent access in a simple interface. The resource agent may be provided by any suitable process such as a dedicated application, an automated service, a script, an interactive shell, or any other suitable process. It is to be appreciated that the resource agent may not require a supporting operating system, and may be, for example, supported by a BIOS of a small form device. For example, the baseboard management controller (BMC) may expose resources that allow a management client to monitor and manage the hardware. The resource agent implementation, such as on the server side, may have some type of standardized plug-in or "provider" model for associating resource identifiers, such as URI values, with the appropriate local handlers. This makes the addition of new handlers a matter of implementing the plug-in model for the particular platform.

Although the client manager 12 may be supported by the same component or system as the resource agent, FIG. 1 illustrates that the client manager 12 may remotely access a resource agent 16 through a connection 14 which may be any suitable connection, such as the Internet, Wide Area Network (WAN) or Local Area Network (LAN). The connection may be regulated by any suitable transport protocol. Although the following examples are described with reference to a connection 14 transport protocol of hypertext transfer protocol (HTTP) and hypertext transfer protocol secure (HTTPS), other transport protocols may be suitable such as TCP/IP, and any other transport protocol suitable for SOAP messages.

Figure 2:
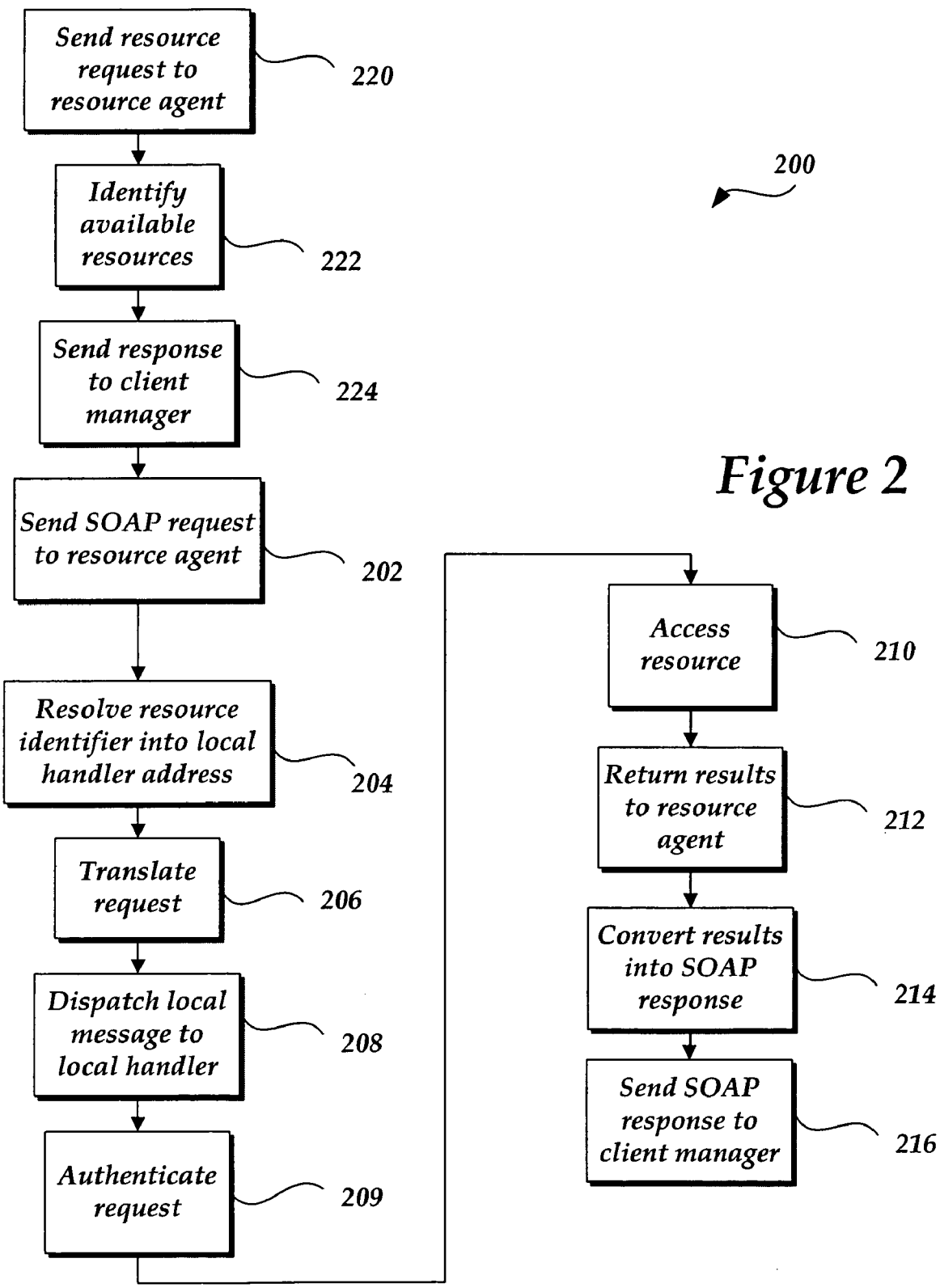
FIG. 2 is a flow chart of an example method of requesting and receiving resource instrumentation information of FIG. 1.

A method 200 of implementing the process of FIG. 1 is illustrated in FIG. 2. To manage the resource 18, the client manager 12 may request instrumentation information from or apply actions to the resource by sending 202 a SOAP request message 30 to the resource agent 16. The request 30 may include a resource indicator indicating the target resource 18 and an operation identifier indicating the information to be retrieved and/or action to be taken.

The client manager may identify the appropriate resource identifier and address of the appropriate resource agent in any suitable manner by either knowing or discovering the appropriate resource identifier and selecting the appropriate operation for that resource and/or selecting the appropriate resource agent 16. In one example, the client manager may send the SOAP request message 30 to all available resource agents and the appropriate agent may self-determine that it is the intended addressee. In another example, the appropriate resource agent for a desired resource may be determined by the client manager in any suitable manner such as by accessing a client data store (not shown) which associates a resource identifier with an address for the appropriate resource agent.

In yet another example, referring to FIGS. 1 and 2, the client manager 12 may send 220 a resource identification message to a resource agent 16 requesting available resources and/or valid operations. The resource agent 16 may identify 222 available resources in any suitable manner, such as by accessing the catalog data store 20 which lists available resource identifier. The catalog data store may be any suitable data store such as a database, a virtual catalog, or hard-wired into software code. One suitable method to generate and store the catalog store 20 is discussed in more detail in U.S. patent application Ser. No. 10/692,432 titled USE OF ATTRIBUTION TO DESCRIBE MANAGEMENT INFORMATION, and filed Oct. 23, 2003, and incorporated herein by reference. The resource agent may send 224 a response to the client manager 12 listing available resource identifiers. The system administrator may select a desired resource identifier from the list, and the client manager may automatically generate the required message to be sent to the resource agent and incorporate the selected resource identifier. The resource agent, in response to the identification message, may also list valid operations and/or accessible information for one or more of the listed resources. In this manner, the systems administrator may choose the desired resource identifier by analyzing the accessible information listing and may choose the desired and valid operation to execute against the selected resource identifier. It is to be appreciated that any suitable user interface of the client component may be appropriate to support receiving resource information from the resource agent, selecting a resource identifier and/or operation identifier, and/or generating a request message to be sent to the resource agent.

Upon receipt of a request message 30 from a client manager requesting an operation against an identified resource 18, the resource agent 16 may resolve 204 the resource identifier into an address for the appropriate local handler 22. The resource agent may use any suitable method or process to resolve the resource identifier into an address for the local handler such as accessing a catalog data store 20 which associates a resource identifier with a local handler address. The catalog data store may be any suitable data store such as a database, a virtual catalog, or hard-wired into software code. The resource agent 16 may then translate 206 the SOAP message 30 into an appropriate format and/or schema compliant with the local handler 22. The resource agent 16 may determine the appropriate schema or message format for the resolved local handler 22. For example, different local handlers 22 for different resources 18 may require different schemas such as message formats, data fields, parameters, actions, and the like. The resource agent may determine the local handler message schema in any suitable manner such as accessing the catalog data store 20 which may associate the local handler address with a communication schema. Appropriate methods of communicating with local handlers and their schema is discussed further in U.S. patent application Ser. No. 10/692,432 titled USE OF ATTRIBUTION TO DESCRIBE MANAGEMENT INFORMATION, and filed Oct. 23, 2003, and incorporated herein by reference.

The local handler 22 associated with a resource 18 may be provided by the provider of the resource to expose information within or about the resource. The resource identifier associated with a resource may be any suitable identifier such as a uniform resource identifier (URI) which may be the same as or different from the URI provided by the manufacturer of the resource. Accordingly, the resource identifier provided by the client manager may be able to direct the resource agent towards the local handler and/or resource desired by the client manager.

The resource agent may dispatch 208 the local request/action message 32 to the resolved address of the local handler 22 for operation on the identified resource 18. It should be recognized that any dispatching architecture may be appropriate for the platform supporting the resource agent 16. The resource agent 16 may additionally propagate the security credentials of the client manager 12 to the local handler so that the local handler can properly authenticate 209 the message. It is to be appreciated that the resource agent and/or the local handler may authenticate the request message. Moreover, it is to be appreciated that any suitable authentication scheme may be appropriate. For example, the content contained in the header and/or body element of the SOAP request 30 may be encrypted. Accordingly, authentication may include decrypting the request. Additionally or alternatively, authentication may include verifying that the header and/or body elements of the SOAP request 30 are in the proper format.

The local handler 22 may then access 210 the appropriate resource 18 to retrieve the requested information and/or enact the indicated operation on the resource. The local handler may return 212 a response 34 containing the results and/or verification of the requested operation to the resource agent 16. The resource agent 16 may convert 214 the results in the response 34 into a SOAP response message 36, such as by translation or encapsulation, and send 216 the response message with the results to the client manager 12.

To manage the resource 18, the client manager 12 may request instrumentation information from and/or apply actions to the resource 18 through a SOAP message 30 sent to the resource agent 16. The resource identifier included in the SOAP request message 30 from the client manager may be any suitable address for the resource 18 such as a name, domain name, IP address, uniform resource locator (URL), uniform resource identifier (URI), or any other suitable unique naming convention that may be communicated by the client manager and resolved by the resource agent to an associated local handler for a resource. For example, the URI may be a location-independent network address with a systems management protocol suffix, such as /wsman. URIs are further described in Berners-Lee et al., "RFC 2396: Uniform Resource Identifiers (URI): Generic Syntax," August 1998, available at http://www.ietf.org/rfc/rfc2396.txt. The resource identifier may identify the target resource, the item or information to be retrieved, the method being accessed, the table being queried, the event stream to which a subscription applies, and the like. For example an HTTP transport URI may be http://1.2.3.4/wsman and a Windows Secure Transport URI may be wst://mymachine.microsoft.com/wsman. It is to be recognized that additional or alternative namespaces may be used as appropriate such as other namespaces may be used as proxy namespaces for logical resources. For example, https://1.2.3.4/wsman/otgweb may be considered a portal namespace for managing the otgweb Web site which may be a distributed deployment using clustered servers. In this manner, no one machine 'owns' the management space.

In another example, the resource identifier may include a common information model (CIM) class compliant with the CIM standard available from DMTF at http://www/dmtf.org/standards/cim and incorporated herein by reference. For example, the Object Path accessor in CIM may become the resource identifier and may be represented by an XML schema. The resource identifier containing a CIM class may also be a URI. For example, a URI for a CIM class may start with a prefix comprising the CIM namespace followed by the class name. Using CIM_NumericSensor as an example, the URI prefix may be:

wsman:dmtf.cim/root/cimv2/CIM.NumericSensor.

The CIM class may have one or more URIs associated with it, each URI accessing an instance of the CIM class. For example, the NumericSensor example may include four URIs, each associated with a 'resource' as a specific instance of the class:

wsman:dmtf.cim/root/cimv2/CIM.NumericSensor
wsman:dmtf.cim/root/cimv2/CIM.NumericSensor?DeviceID=_1
wsman:dmtf.cim/root/cimv2/CIM.NumericSensor/Reset-?DeviceId=_1/Reset
wsman:dmtf.cim/root/cimv2/CIM.NumericSensor/SetPowerState?DeviceId=_1

In the above example, the first URI may reference a resource that enumerates all instances whereas the second URI may retrieve a specific instance identified by its key property (e.g., multiple keys may be comma separated). For example, a general syntax may be used such as:

key1=value1+key2=value2+key3=value3

If the value of a key contains a '+', '=', or any other suitable symbol, then a parenthesis or other suitable separator may be used, e.g., key=(1+2=3). Generally, conversion of a CIM class to a URI may involve generating a number of URIs or other resource identifiers. For example, there may be one URI for getting individual instances, another URI for enumerating all instances of the class, another URI for each method, another URI for each type of update of writeable properties, and possibly another URI for each creation and/or deletion of instances.

As shown in the example schematic SOAP request of FIG. 3, the SOAP request 30 may contain a SOAP envelope element 302, a SOAP header element 304, and a SOAP Body element 306. As shown in FIG. 3, the header element may include a To header 308, an Action header 310, and a MessageID header 312. In this manner, the SOAP message 30 from the client manager 12 includes at least one tuple including an operation identifier and a resource identifier 314 and indicates that it is a SOAP message with contents that are compliant with a specification accessible through the defined XML namespace.

The To header may contain a transport-level address of the resource agent and the namespace within the system supporting the resource agent and may be compliant with WS-Addressing standards. The To header element may also contain a mustUnderstand attribute which may be set equal to TRUE.

The SOAP request 30 may also contain a MessageID header which may contain a message identifier, such as a UUID, indicating a particular message and may be compliant with the WS-Addressing MessageID standard. The MessageID header may also contain a mustUnderstand attribute which may be set equal to TRUE. An example message ID field may take the form of

```
<wsa:MessageID env:mustUnderstand="true">
   uuid:e83327d2-7eab-4ad2-8c76-e206e763d634
</wsa:MessageID>
```

The Action header 310 may indicate that the request message 30 is a particular type of request for a particular operation or action. The Action header may also contain a mustUnderstand attribute that may be set equal to TRUE. The operation may be identified by any suitable identifier such as a name, number, or namespace. As shown in FIG. 3, the operation identifier may take the format of <namespace of governing standard>/<name of operation>. In this manner, the Action header may be compliant with the standards defined in the namespace of the operation identifier. The governing standard for the operation may include a user defined or accepted standard such as wsman—http://schemas.xmlsoap.org/ws/2004/04/ws-manprof
wsa—http://schemas.xmlsoap.org/ws/2003/03/addressing
wsh—http://schemas.xmlsoap.org/ws/2004/04/shellexec
wxf—http://schemas.xmlsoap.org/ws/2004/01/transfer
wsen—http://schemas.xmlsoap.org/ws/2004/04/enumeration
wse—http://schemas.xmlsoap.org/ws/2004/01/eventing
xs—http://www.w3.org/2001/XMLSchema The WS-Addressing namespace is described in Bosworth et al., "Web Services Addressing (WS-Addressing)," Mar. 13, 2003, http://msdn.microsoft.com/library/default.asp?url=/library/en -us/dnglobspec/html/wsaddressingspecindex.asp. The wsh, or WS-ShellExecute, namespace may define and/or configure operations of the client manager. The wxf, or WS-Transfer, namespace, may provide operations suitable for management of network systems, e.g., Get, Put, Create, and Delete. The wse, or WS-Enumeration, namespace may provide the Enumerate operation and optional subordinate operations. The wse, or WS-Eventing, namespace may expose event subscription operations which may allow client managers to receive events from streaming sources. The xs, or XML, namespace may define the configuration and format of XML. XML is described further in Gudgin et al., "SOAP 1.2 Part 1: Messaging Framework," Jun. 23, 2003, http://www.w3.org/TR/2003/REC-soap12-part1-20030624/.

Those of skill in the art will recognize that the namespace locations and the namespace prefixes may be selected as appropriate. For example, custom or user defined namespaces may also be suitable to defined custom methods and/or user-defined actions. The namespaces may be defined as a convention for headers and/or operations. For example, the WSDL, WS-Addressing, and other protocol defined namespaces may define SOAP header and/or body element blocks to standardize the identification of the operation, the message identification, the sender, the recipients, and the like.

The prefix of the namespace may be used to define the associated instruction or operation in the SOAP message 30. Any suitable operation may be defined through any suitable specification defined in a namespace including operation names of Get, Put, Create, Delete, Enumerate, Pull, Release, Subscribe, Unsubscribe, Renew, OpenShell, CloseShell, ControlShell, Command, CommandIO, Trap, EventBatch, or any other suitable operation indicator for managing a network system resource. The identified operation may also allow parameters to be set and/or input for the execution of the indicated operation, and may be indicated by the operation parameters which may be included in the header element 304 and/or body element 306.

The request 30 may also contain a resource identifier field 314 containing a resource identifier, such as a URI, which identifies the target resource, e.g., an indicator of the object which is being retrieved or modified, the table being enumerated, and the like. Together the To header and the ResourceURI element may form a complete network path from the client manager to the specific target resource. The resource identifier field may contain a mustUnderstand attribute set to TRUE. The element identifying the target resource may be contained in the header element and/or body element as appropriate. For example, a resource identifier element for a disk drive may take the form of

```
<wsaResourceURI env:mustUnderstand='true'
    wsman:Microsoft.os.storage.disks/Drives/diskInfo?drive=c:
</wsa:ResourceURI>
```

Other operation and message parameters may included in additional headers and/or in the body element 306 of the request message 30.

Referring to FIG. 1, upon receipt of a SOAP request 30 including a resource identifier and action identifier, the resource agent 16 may resolve the resource identifier into a local handler 22 address, translate the request, and dispatch the translated request 32 to the local handler. The resource agent and/or local handler may also authenticate the SOAP request 30, which may be under a consistent authentication scheme defined by the SOAP standards. The local handler may access the indicated resource 18 and retrieve the requested information and/or execute the indicated operation. The results 34, such as the retrieved information and/or an indication of success or failure of the operation, may be sent from the local handler to the resource agent. The resource agent may convert the result into a SOAP response 36 and send that response to the client manager in reply to the SOAP request 30.

As shown in the example schematic SOAP response of FIG. 4, the SOAP response 36 may contain a SOAP envelope element 402, a SOAP header element 404, and a SOAP Body element 406. As shown in FIG. 4, the header element may include a From header 408, an Action header 410, a MessageID header 412, and a RelatesTo header 414. Other operation and message parameters may included in additional headers and/or in the body element 406 of the response message 36. In this manner, the SOAP response message 36 from the resource agent 16 includes at least one tuple including an operation identifier and a RelatesTo message identifier and indicates that it is a SOAP message with contents that are compliant with a specification accessible through the defined XML namespace.

The From header may contain a transport-level address of the resource agent and/or a resource agent identifier, and the namespace within the system supporting the resource agent which may be compliant with WS-Addressing standards. The address of the resource agent may be the same as or different from the address of the resource agent provided in the To header of the associated request 30.

The MessageID header 412 may contain a field indicating a message identifier which identifies the specific message any be compliant with the WS-Addressing MessageID standard. The MessageID header may also contain a mustUnderstand attribute which may be set equal to TRUE.

The RelatesTo header 414 may include a field containing a copy of the message ID of the original request. In this manner, the client manager may distinguish between simultaneously arriving replies using some modes of transports. The RelatesTo header may be compliant with WS-Addressing standards.

The Action header 410 of the SOAP response 36 may contain an operation identifier which indicates that the message is response to a request of a particular operation. The Action header may also contain a mustUnderstand attribute that may be set equal to TRUE. The operation may be identified by any suitable identifier such as a name, number, or namespace. As shown in FIG. 4, the operation identifier may take the format of <namespace of governing standard>/<name of operation>Response. In this manner, the Action header may be compliant with the standards defined in the namespace of the operation identifier.

The SOAP request and response messages may be coded using any appropriate character encoding standard such as UNICODE 3.0 (UTF-16) and UTF-8. The characters supported by the management system 10 may include U+0000 to U+007F inclusive with both UTF-8 and/or UTF-16 encodings and may support characters outside this range.

WS-Transfer Messages

Get Request and Response A Get request containing a Get action identifier may retrieve information from a resource 18 indicated by the resource identifier of the SOAP request 30. The information retrieved may be a representation or value of a resource, which may simple or complex values, such as an instance, a file system resource, and the like. Example information retrieved by a Get operation may include configuration settings or dynamic runtime-only values such as disk free space, hardware status, application settings, operating system performance values, and the like. The Get operation may be appropriate for a singleton and may not be appropriate for multiple entries or rows from tables and logs, however, the Get operation may be suitable for retrieving a single entry from such collections.

In one example, the Get request has an empty body element and all information describing what instrumentation information to retrieve is contained in the SOAP header element. The Get message may contain a TO header, an Action header, a ResourceURI header, a MessageID header, an optional Timeout header, an optional Locale header, an optional Summary header, and any other header suitable for a Get request. One example of a Get request 30 is illustrated in FIG. 3 described above.

The To header, ResourceURI header, Action header, MessageID header may be similar to those described above with reference to FIG. 3. The Action header may contain the name of the operation which may be any suitable action or operation indicator such as Get, providing a namespace of http://schemas.xmlsoap.org/ws/2004/01/transfer/Get, which may be compliant with WS-Transfer standards.

The Get request message may contain an optional Timeout header which indicates the maximum amount of time the client is willing to wait for a reply. If the time expires without information from the resource, the resource agent 16 may return a fault message. If the resource agent cannot comply with the specified Timeout period, the resource agent may return an Unsupported Timeout or other suitable fault message. If the Timeout field is not defined in the message, the resource agent 16 may implement a default timeout period which may be published. The Timeout header may be compliant with the xs namespace standards and may be a xsd:duration.

The Get request message may also include an optional Locale header containing a locale identifier indicating the locale of the client element to assist the resource agent when producing localized content. The locale identifier may use an XML attribute 'lang' whose value conforms to ISO 639 language codes described further in http://www.w3.org/WAI/ER/IG/ert/iso639.htm. The resource agent 16 may access the locale identifier and default fault and textual descriptions to match the indicated locale. It is to be appreciated that if the resource agent cannot comply with the indicated locale, it may return a fault message or may return all messages in a default locale, such as English. The Locale header may be complaint with the wsman namespace standards described herein.

The Get request message may include an optional Summary header that provides a hint to the resource agent that a summary representation is preferred if available. Summary representations may be abbreviated equivalents with less detail, but may be lightweight and more efficient. The Summary header may be complaint with the wsman namespace standards described herein.

The information communicated by the Get response message may included in the SOAP response message 36 header and/or body element, as may be appropriate. For example, the retrieved information may be contained in the body element, and various headers may contain message identifying information The Get response message may contain a From header, an Action header, a MessageID header, a RelatesTo header as described above, and any other header suitable for a Get response. An example Get response is illustrated in FIG. 4.

The From header may also contain the resource identifier which may be the same as the resource identifier sent in the ResourceURI header of the Get request. The resource identifier may be wrapped in a WS-Addressing wrapper, such as a ResourceProperties element. The From field may be compliant with WS-Addressing for the base type as defined by WS-Transfer.

An Action header of a Get response message 36 may indicate that the message is a response to a Get request. The Action header may be compliant with WS-Addressing for the based type as defined by the WS-Transfer protocol. Accordingly, the Get Action namespace may be constant and be http://schemas.xmlsoap.org/ws/2004/01/transfer/GetResponse.

The body element to a Get response may contain the information from the resource and may be in any suitable format including an XML Infoset. If the resource agent 16 cannot respond to the any of the above requests with the requested information, the resource agent may send a suitable fault response as described further below.

In one example, a client manager may desire the fan speed of a motherboard identified by the URI of wsman:acme.boards.model12012/fanspeed. In this case, the resource is a single, read-only value, and therefore compatible with a Get operation. The client manager 12 may build a SOAP message 30 indicating the Get operation and the URI of the motherboard, and send the message 30 to the resource agent 16. The resource agent 16 may access the catalog data store 20 to resolve the resource identifier, here a URI, to the location of the local handler 22 and the schema for communicating with the local handler. The resource agent 16 may reformat the operation identifier of the SOAP message 30 into the appropriate schema for communicating with the local handler and send the operation to the local handler. The resource agent may also forward to the local handler the client component's security credentials so that the operation can be properly secured, audited, and executed by the local handler. The local handler may determine the desired value and return it to the resource agent in a message 34. The resource agent 16 may then enclose the retrieved value in a SOAP response message 36 having the format of a Get Response and send the message to the client manager 12. The SOAP response message may include a SOAP body element such as wxf:GetResponse <speed xmlns="http://schemas.acme.com/2004/07/model12012"> 1200</speed> to communicate the desired resource information to the client manager. The client manager 12 may extract the value (an XML Infoset) from the SOAP response message 36, and display the value to the user through a display device.

Put Request and Response

The Put SOAP request 30 may request that information of an existing resource 18 be updated. The information may be "settings' or "configuration" values, whether permanent or temporary, and may include disk volume comment, logging level of a device, cache size setting, working directory, or any other appropriate setting or configuration value that is not read-only. The Put operation may update a single value of may update an entire file.

Some values of resources may be read-only or may be read-write. If the value is read-only, the resource agent may determine the legality of the update request in a Put request. For example, a resource representing a complex real-world object, such as a logical disk drive with a volume label may provide disk information within the body of a Get response as:

```
<DiskInfo xmlns=http://schemas.microsoft.com/windows/os/diskinfo">
    <Drive> C: </Drive>
    <TotalCapacity> 12000000000 </TotalCapacity>
    <FreeSpace> 802012911 </FreeSpace>
    <FileSystem> NTFS </FileSystem>
    VolumeLabel> CDrive </VolumeLabel>
</DiskInfo>
```

In the above example, only the VolumeLabel value may be read-write, and the rest of the retrieved information may be read only. The status, either read-write or read-only, may be exposed in any suitable manner. For example, the resource identifier, such as a URI, may be different for a Get operation than for a Put operation. In this manner, the Get URI for a resource may expose those values that can be read, whereas the Put URI for the same resource may expose only those values which are read-write capable. Alternatively, the resource identifier may be the same for a Get operation as for a Put operation, however, the resource agent may validate the property of the value of the resource to determine if the resource value indicated may be 'put', e.g., is a read-write capable value. The resource agent 16 may validate the resource property using any suitable method including accessing the catalog data store 20 which may associate the resource identifier with a resource property identifier. If the indicated Put operation does not reference a resource identifier having a valid property type, e.g., a read-only resource value, then the resource agent may return a fault message.

The information communicated by the Put request message may be included in the header and/or body element of the request message as appropriate. For example, the information regarding the resource and put information may be included in the body element of the SOAP message 30 and may also provide additional headers in the header element to identify other suitable message information. The Put message may contain a To header, an Action header, a MessageID header, a ResourceURI header, an optional Timeout header, an optional Locale header, and any other suitable header for a put request. The To header, Action header, MessageID header, and ResourceURI header may be similar to those described above with reference to FIG. 3. The Action header may be compliant with the WS-Transfer protocol. Accordingly, the Put Action namespace may be constant and be http://schemas.xmlsoap.org/ws/2004/01/transfer/Put. The Timeout and Locale headers may be similar to those headers described above with reference to the Get request. The body of the Put request may contain the new representation of the resource to be implemented, such as in an XML Infoset. One example of a Put request is shown below. Although the body element below lists both read-write and read-only values, the resource agent will only implement the read-write type values, here the VolumeLabel.

Upon receiving a Put request, the resource agent 16 may follow a best-effort logic to carry out the update through the appropriate local handler 22 and resource 18, as shown in FIG. 1. In response to a Put request, the resource agent 16 may generate a Put SOAP response 36. The Put response may indicate success and optionally may contain the new updated resource, or may return a fault response. The information communicated by the Put response may be included in the header element of the SOAP response and may optionally include information in the SOAP body element.

The Put response message 36 may contain a From header, an Action header, a MessageID header, a RelatesTo header, a NewResourceURI header, and any other header suitable for a Put response. The From header, Action header, MessageId header and RelatesTo header may be similar to those headers described above with reference to FIG. 3. The From header may include the Address element with the address of the resource agent and may also include a Reference Properties element which contains the resource identifier of the target resource indicated in the Put request. The resource identifier may be wrapped in a Resource URI element. The Action header may be compliant with the WS-Transfer protocol. Accordingly, the Put Action namespace may be constant and be http://schemas.xmlsoap.org/ws/2004/01/transfer/PutResponse. The NewResourceURI header may be used to indicate the new URI of the resource. In this manner, the Put operation may cause the resource identifier such as a URI to change, e.g., a rename operation. The client manager 12 may store the resource identifier to ensure that future messages to that resource are identified properly, such as in the catalog data store.

```
(1)     <?xml version="1.0"?>
(2)     <env:Envelope
(3)         xmlns:env="http://www.w3.org/2003/05/soap-envelope"
(4)         xmlns:wsman="http://schemas.xmlsoap.org/ws/2004/06/wsman"
(5)         xmlns:wsa="http://schemas.xmlsoap.org/ws/2003/03/addressing">
(6)
(7)         <env:Header>
(8)             <wsa:To env:mustUnderstand="true">
(9)                 https://1.2.3.4/wsman
(10)            </wsa:To>
(11)
(12)            <wsa:Action env:mustUnderstand="true">
(13)                http://schemas.xmlsoap.org/ws/2004/01/transfer/Put
(14)            </wsa:Action>
(15)            <wsa:MessageID env:mustUnderstand="true">
(16)                uuid:d9726315-bc91-430b-9ed8-ce5ffb858a87
(17)            </wsa:MessageID>
(18)
(19)            <wsman:ResourceURI env:mustUnderstand="true">
(20)                wsman:microsoft.os.storage.disks/Drives/diskInfo?drive=c:
(21)            </wsman:ResourceURI>
(22)            <wsman:Timeout> PT30S </wsman:Timeout>
(23)        </env:Header>
(24)
(25)        <env:Body>
(26)            <DiskInfo xmlns=http://schemas.com/2004/06/diskinfo">
(27)                <Drive> C: </Drive>
(28)                <TotalCapacity> 12000000000 </TotalCapacity>
(29)                <FreeSpace> 802012911 </FreeSpace>
(30)                <FileSystem> NTFS </FileSystem>
(31)                <VolumeLabel> MyCDisk </VolumeLabel>
(32)            </DiskInfo>
(33)        </env:Body>
(34)
(35)    </env:Envelope>
```

An example Put response is illustrated below.

```
(1)     <?xml version="1.0"?>
(2)     <env:Envelope
(3)         xmlns:env="http://www.w3.org/2003/05/soap-envelope"
(4)         xmlns:wsman="http://schemas.xmlsoap.org/ws/2004/06/wsman"
(5)         xmlns:wsa="http://schemas.xmlsoap.org/ws/2003/03/addressing">
(6)
(7)     <env:Header>
(8)         <wsa:From>
(9)             <wsa:Address> http://1.2.3.4/wsman </wsa:Address>
(10)            <wsa:ReferenceProperties>
(11)                <wsman:ResourceURI>
(12)                    wsman:microsoft.os.storage.disks/Drives/diskInfo?drive=c:
(13)                </wsman:ResourceURI>
(14)            </wsa:ReferenceProperties>
(15)        </wsa:From>
(16)        <wsa:Action env:mustUnderstand="true">
(17)            http://schemas.xmlsoap.org/ws/2004/01/transfer/PutResponse
(18)        </wsa:Action>
(19)        <wsa:RelatesTo >
(20)            uuid:d9726315-bc91-430b-9ed8-ce5ffb858a87
(21)        </wsa:RelatesTo>
(22)        <wsa:MessageId>
(23)            uuid:f9726325-aa90-120b-6ed2-ae5ffb223a81
(24)        </wsa:MessageId>
(25)        <wsman:NewResourceURI>
(26)            wsman:microsoft.os.storage.disks/Drives/diskInfo?drive=c:
(27)        </wsman:NewResourceURI>
(28)    </env:Header>
(29)
(30)    <env:Body/>
(31)    </env:Envelope>
```

In a successful Put operation, the body of the put response may be left blank. Alternatively, the body of the SOAP response message 36 may be used to communicate the value actually put into the resource. For example, it may verify that the proper value was put by the local handler into the resource, or if the resource agent needed to change a value, the returned value may communicate that the requested put value was modified during the Put operation. For example, the Put request may request that the name be changed to "los angeles". The resource agent 16 may accept the put action, but may modify the name such that the final representation is not identical, e.g., may change the name to "Los Angeles, Calif.". The modified information may be placed into the body of the response message in a manner similar to the Get response illustrated in FIG. 4. If the resource agent 16 cannot successfully put the indicated value into the indicated resource 18, the resource agent may send a suitable fault response.

Create Request and Response

The Create request may create a new resource 18 indicated by the resource identifier of the SOAP message 30. Accordingly, the Create operation may create a new resource which can be subsequently queried or retrieved using a Get request. In some cases, the Create operation may be logically equivalent to a 'constructor' in object-oriented databases and programming languages, e.g., the create request may create any resource which can subsequently be accessed by other wsman operations. Example new resources may include a new log, a new shared disk volume, a new-user, a new file, a new network share point, a new performance monitoring process, and the like. Although the new resource may support retrieval of information through Get operations, updating of information with a Put operation and/or deletion of information with a Delete operation, it should be appreciated that any combination or no operations may be supported by the newly created resource. For example, a newly created resource may allow a Put operation to update the resource information but not allow a Get operation to discover that information.

The Create request may indicate a resource identifier which indicates a 'factory' resource which creates the resource, and may also include a resource identifier for the new resource and any other parameters required to create the new resource, which may be submitted as an XML Infoset. The factory resource may function as a constructor and the resource identifier of the new resource may be communicated in the SOAP request message 30 through the body element or the header element. The Create request may include a To header, an Action header, a MessageID header, a ResourceURI header, an optional Timeout header, an optional Locale header, and any other suitable header for a Create request. An example Create message is illustrated below.

```
(1)     <?xml version="1.0"?>
(2)     <env:Envelope
(3)         xmlns:env="http://www.w3.org/2003/05/soap-envelope"
(4)         xmlns:wsman="http://schemas.xmlsoap.org/ws/2004/06/wsman"
(5)         xmlns:wsa="http://schemas.xmlsoap.org/ws/2003/03/addressing">
(6)     <env:Header>
```

```
(7)         <wsa:To env:mustUnderstand="true">
(8)             https://1.2.3.4/wsman
(9)         </wsa:To>
(10)
(11)        <wsa:Action env:mustUnderstand="true">
(12)            http://schemas.xmlsoap.org/ws/2004/01/transfer/Create
(13)        </wsa:Action>
(14)
(15)        <wsa:MessageID env:mustUnderstand="true">
(16)            uuid:d9726315-bc91-430b-9ed8-ce5ffb858a87
(17)        </wsa:MessageID>
(18)
(19)        <wsman:ResourceURI env:mustUnderstand="true">
(20)            wsman:microsoft.os.networking/shares/create
(21)        </wsman:ResourceURI>
(22)
(23)        <wsman:Timeout> PT30S </wsman:Timeout>
(24)    </env:Header>
(25)
(26)    <env:Body>
(27)        <CreateShare xmlns="http://schemas.org/2004/06/shareCreate">
(28)            <Name> SchemaShare </Name>
(29)            <Resource> c:\temp\xmlschemas </Resource>
(30)            <Label> This is where I share out my XML schemas </Label>
(31)        </CreateShare>
(32)    </env:Body>
(33)
(34)    </env:Envelope>
```

The To header, the Message ID header, the Timeout header, and Locale header of the Create request may be similar to those described above with reference to the Get request. The Action header may indicate that the requested action or operation of a create operation and may be compliant with the WS-Transfer standard. The Create Action header may be constant and may take the form of:

```
<wsa:Action env:mustUnderstand="true"
    http://schemas.xmlsoap.org/ws/2004/01/transfer/Create
</wsa:Action>
```

The Resource ID header may be similar to that described above, however, the resource identifier contained in the resource ID header field may be the resource ID of the factory resource which may create the new resource. The body of the create message may contain the parameters which represent the values required to create or construct the new resource, and may be in the form of an XML Infoset.

The resource agent 16, after receiving a Create request may communicate with the local handler for the indicated factory resource and create the new resource. The resource agent may respond to the client manager 12 with a Create response indicating success and the new resource identifier of the created resource, or may indicate a fault message. The Create response may contain a From header, an Action header, a Message ID header, and any other suitable header for a Create response. An example Create response is illustrated below.

```
(1)     <?xml version="1.0"?>
(2)     <env:Envelope
(3)         xmlns:env="http://www.w3.org/2003/05/soap-envelope"
(4)         xmlns:wsman="http://schemas.xmlsoap.org/ws/2004/06/wsman"
(5)         xmlns:wsa="http://schemas.xmlsoap.org/ws/2003/03/addressing">
(6)
(7)         <env:Header>
(8)             <wsa:From>
(9)                 <wsa:Address> http://1.2.3.4/wsman </wsa:Address>
(10)                <wsa:ReferenceProperties>
(11)                    <wsman:ResourceURI>
(12)                        wsman:microsoft.os.networking/shares/create
(13)                    </wsman:ResourceURI>
(14)                </wsa:ReferenceProperties>
(15)            </wsa:From>
(16)            <wsa:Action env:mustUnderstand="true">
(17)                http://schemas.xmlsoap.org/ws/2004/01/transfer/CreateResponse
(18)            </wsa:Action>
(19)            <wsa:RelatesTo >
(20)                uuid:d9726315-bc91-430b-9ed8-ce5ffb858a87
(21)            </wsa:RelatesTo>
(22)            <wsa:MessageId>
(23)                uuid:f9726325-aa90-120b-6ed2-ae5ffb223a81
(24)            </wsa:MessageId>
```

```
(25)        </env:Header>
(26)
(27)        <env:Body>
(28)           <wxf:ResourceCreated>
(29)              <wsman:ResourceURI>
(30)                 wsman:os.shares/SchemaShare
(31)              </wsman:ResourceURI>
(32)           </wxf:ResourceCreated>
(33)        </env:Body>
(34)
(35)     </env:Envelope>
```

The From header and Message ID header may be similar to those described above with reference to the Get response. The Action header may indicate that the response is a Create Response action, and may have the value: http://schemas.xmlsoap.org/ws/2004/01/transfer/CreateResponse. The resource identifier for the new resource may be in a new resource header, or alternatively, may be contained in the body element of the create response, such as a ResourceCreated wrapper containing a ResourceURI element. If the resource agent 16 cannot successfully create the new resource, the resource agent may send a suitable fault response. The fault response may indicate the reason why the resource agent cannot create the new resource.

Delete Request and Response

The Delete operation may remove an existing resource 18 indicated by the resource identifier of the SOAP message 30. The delete operation may be logically similar to a destructor in object-oriented databases and programming languages. Example deleted resources may include an obsolete log, an unused share volume, a user accounts, and the like.

The Delete SOAP message may communicate the resource identifier of the resource to be removed in the header element or body element of the SOAP message. In one example, the resource identifier may be contained in the header element. The Delete request may include a To header, an Action header, a Message ID header, an optional Timeout header, a ResourceURI header, and any other header suitable for a delete request. An example Delete request is shown below.

```
(1)     [<?xml version="1.0"?>
(2)     <env:Envelope
(3)        xmlns:env="http://www.w3.org/2003/05/soap-envelope"
(4)        xmlns:wsman="http://schemas.xmlsoap.org/ws/2004/06/wsman"
(5)        xmlns:wsa="http://schemas.xmlsoap.org/ws/2003/03/addressing">
(6)
(7)        <env:Header>
(8)           <wsa:To env:mustUnderstand="true">
(9)              https://1.2.3.4/wsman
(10)          </wsa:To>
(11)          <wsa:Action env:mustUnderstand="true">
(12)             http://schemas.xmlsoap.org/ws/2004/01/transfer/Delete
(13)          </wsa:Action>
(14)
(15)       <wsa:MessageID env:mustUnderstand="true">
(16)          uuid:d9726315-bc91-430b-9ed8-ce5ffb858a87
(17)       </wsa:MessageID>
(18)
(19)    <wsman:ResourceURI env:mustUnderstand="true">
(20)       wsman:microsoft.os.network.share/delete/MyShare
(21)    </wsman:ResourceURI>
(22)     <wsman:Timeout> PT30S </wsman:Timeout>
(23)     </env:Header>
(24)
(25)    <env:Body/>
(26)
(27)    </env:Envelope>
```

The To header, MessageID header, and ResourceURI header may be similar to those described above with respect to the Get request. The Action header may indicate that the response is a Delete Request action, and may have the value: http://schemas.xmlsoap.org/ws/2004/01/transfer/Delete which may be compliant with WS-Transfer standards.

The resource agent 16, after receiving a Delete request may communicate with the local handler 22 for the indicated resource and delete the new resource. The resource agent may respond to the client manager 12 with a delete response indicating success, or may indicate a fault message. The Delete response may contain a From header, an Action header, a Message ID header, a RelatesTo header, and any other suitable header for a Create response. An example Create response is illustrated below.

```
(1)
(2)      <?xml version="1.0"?>
(3)      <env:Envelope
(4)          xmlns:env="http://www.w3.org/2003/05/soap-envelope"
(5)          xmlns:wsman="http://schemas.xmlsoap.org/ws/2004/06/wsman"
(6)          xmlns:wsa="http://schemas.xmlsoap.org/ws/2003/03/addressing">
(7)
(8)        <env:Header>
(9)        <wsa:From>
(10)          <wsa:Address> http://1.2.3.4/implementation </wsa:Address>
(11)          <wsa:ReferenceProperties>
(12)            <wsman:ResourceURI>
(13)              microsoft.os.network.share/delete/MyShare
(14)            </wsman:ResourceURI>
(15)          </wsa:ReferenceProperties>
(16)        </wsa:From>
(17)
(18)        <wsa:Action env:mustUnderstand="true">
(19)          http://schemas.xmlsoap.org/ws/2004/01/transfer/DeleteResponse
(20)        </wsa:Action>
(21)
(22)        <wsa:RelatesTo >
(23)            uuid:d9726315-bc91-430b-9ed8-ce5ffb858a87
(24)        </wsa:RelatesTo>
(25)        <wsa:MessageId>
(26)            uuid:f9726325-aa90-120b-6ed2-ae5ffb223a81
(27)        </wsa:MessageId>
(28)
(29)        </env:Header>
(30)
(31)        <env:Body/>
(32)      </env:Envelope>
```

The From header, Message ID header, and RelatesTo header may be similar to those described above with reference to the Get response. The Action header may indicate that the response is a Delete Response action, and may have the value: http://schemas.xmlsoap.org/ws/2004/01/transfer/DeleteResponse.

If the resource agent 16 cannot successfully delete the resource, the resource agent may send a suitable fault response. The fault response may indicate the reason why the resource agent cannot delete the new resource.

WS-Enumeration Messages

Enumerate Request and Response

The Enumerate request may create an enumeration sequence or list of the contents of a container or table-based resource 18 identified by the resourced identifier of the SOAP message 30. Table based resources may include tables, logs and the like. Each table 'row' or log entry may be an XML fragment or document, so that the entire table may be a list of XML fragments or documents. The resource may contain a single schema or a mix of schemas. An Enumerate operation may be applied against dynamic lists such as running processes, lists of logged-on users, event log content and the like.

After receiving an enumeration request, the resource agent 16 may send an enumerate response message which contains a token such as an Enumeration Context which represents the enumerator. If the targeted resource cannot supply an enumeration of its content, a fault message may be returned. In this manner the Enumerate operation may create an enumerator which may be accessed with one or more Pull requests which 'pull' the content from the enumerator in the Pull responses. The pulled information may be in any suitable format, such as an XML Infoset in the body element of the Pull response. Each Pull response may have one or more XML Infosets representing the enumeration. At any time, the resource agent may issue a fault response if the enumeration cannot be continued or a timeout occurs. The enumerator may be terminated early, e.g., before all batches of the information in pulled, with a Release operation.

The Enumerate request message 30 may include information in the header element and/or the body element of the SOAP message 30. In one example, the Enumerate request message may include a To header, an Action header, a Message ID header, a ResourceURI header, a Timeout header, a Locale header, and any other header suitable for an Enumerate request. The body element of the Enumerate request message 30 may include any other parameters which specify the filter or query, such as an XPath query, applied to the enumeration. If the body element is empty, the resource agent may interpret the Enumerate request as a simple enumeration. An example Enumerate Request is illustrated below.

```
(1)      <?xml version="1.0"?>
(2)      <env:Envelope
(3)          xmlns:env="http://www.w3.org/2003/05/soap-envelope"
(4)          xmlns:wsman="http://schemas.xmlsoap.org/ws/2004/06/wsman"
(5)          xmlns:wsa="http://schemas.xmlsoap.org/ws/2003/03/addressing"
(6)          xmlns:wsen="http://schemas.xmlsoap.org/ws/2004/04/enumeration">
         <env:Header>
(7)        <wsa:To env:mustUnderstand="true">
```

-continued

```
(8)              https://1.2.3.4/wsman
(9)          </wsa:To>
(10)
(11)     <wsa:Action env:mustUnderstand="true">
(12)         http://schemas.xmlsoap.org/ws/2004/04/enumeration/Enumerate
(13)     </wsa:Action>
(14)
(15)     <wsa:MessageID env:mustUnderstand="true">
(16)         uuid:d9726315-bc91-430b-9ed8-ce5ffb858a87
(17)     </wsa:MessageID>
(18)
(19)     <wsman:ResourceURI env:mustUnderstand="true">
(20)         wsman:microsoft.os.system.processes/list
(21)     </wsman:ResourceURI>
(22)   </env:Header>
(23)
(24)   <env:Body>
(25)     <wsen:Enumerate>
(26)         <wsen:Filter>
(27)             Process[Type="Service"]
(28)         </wsen:Filter>
(29)     </wsen:Enumerate>
(30)   </env:Body>
(31)
(32)  </env:Envelope>
```

The To header, the Message ID header, ResourceURI header, Timeout header, and Locale header may be similar to those headers described above with reference to the Get request. The Action header may indicate that the response is an Enumeration action, and may have the value: http://schemas.xmlsoap.org/ws/2004/04/enumeration/Enumerate and may be compliant with WS-Enumeration standards.

The Enumeration header may also include a mustUnderstand field set to TRUE. In one example, the Enumerate request message 30 may include a Filter element which supports mixed content. In some cases, the default dialect for filters may be XPath and other dialects may be indicated with a Dialect attribute. If another dialect is indicated, the language must have a URI or other suitable identifier associated with it such that the provided query may be parsed and enacted. For example, a body element of an example Enumeration request may be:

```
...
<s:Body ...>
    <wsen:Enumerate>
        <wsen:Filter Dialect="xs:anyURI"?> </wsen:Filter>
        Query text or XML
    </wsen:Enumerate>
</s:Body>
</s:Envelope>
```

In another example, the query may be structured using an XML rather than a simple string. In this case, an XML namespace may be provided in addition to the XML. An example body element of an Enumeration request indicating a union of independent SQL queries may be:

```
...
<s:Body ...>
    <wsen:Enumerate>
        <wsen:Filter
            <myQuery:Query
                xmlns:myQuery="queries.org/2003/3/myquery">
```

-continued

```
                <Sql> select * from ProcessList </Sql>
                <Sql> select * from UserList </Sql>
            </myQuery>
        </wsen:Filter>
    </Enumerate>
</s:Body>
</S:Envelope>
```

The token, e.g., Enumeration Context, communicated to the client manager 12 from the Resource agent 16 may be contained in a header element or body element of the SOAP response. In one example, the token may be contained in the body element. The Enumerate response may contain additional headers to communicate other response information including a From header, an Action header, a MessageID header, a RelatesTo header, and any other suitable header for an Enumerate response. These headers may be similar to those described above with reference to the Get response. The Action header may indicate that the response is an Enumeration response action, and may have the value: http://schemas.xmlsoap.org/ws/2004/04/enumeration/EnumerateResponse and may be compliant with WS-Enumeration standards.

The token may indicate a handle or identifier representing the specific enumerator. In one example, the token identifier may be communicated in the body element with an <EnumerationContext> element, which in one example may resemble:

```
...
<env:Body>
    <wsen:EnumerateResponse>
        <wsen:EnumerationContext>
            uuid:d9726315-bc91-430b-9ed8-ce5ffb858a84
        </wsen:EnumerationContext>
    </EnumerateResponse>
</Env.Body>
```

The resource agent 16 may be free to populate the enumerator with any information or format, including a UUID, a handle value, or an address understood by the resource agent so that when a subsequent Pull request is attempted, the resource agent is able to convert the token identifier value into something that it understands locally. For example, the above UUID may point to the enumeration created by the resource agent, however, with each subsequent pull operation on the same UUID, the resource agent may be required to track where in the enumerator, that UUID points. Thus, it may be appropriate in some cases for the resource agent to refrain from maintaining the current position within the enumerator, and may return the next pointer location in the enumerator as part of the context of a pull message. In this manner, the client manager 12 effects maintenance of the enumerator state, since the received enumerator identifier points to the appropriate state location within the enumerator. For example, the <EnumerationContext> element may include a StartAt element or any other appropriate attribute or element, which tells the subsequent pull request where to start and this value may be continually updated as the pull process progresses. In one example, the <EnumerationContext> element may resemble:

<myEnum:id> 0xFFA012 </myEnum:id>
    <myEnum:startAt> 0 </myEnum:startAt>

One example Enumeration response is shown below.

appropriate <EnumerationContext>. In the first pull request, the appropriate <EnumerationContext> is retrieved from the Enumerate response. Subsequent Pull requests may use the same <EnumerationContext> if the cursor state is maintained by the resource agent, or from the Pull response, or may be determined in any other suitable manner such as an algorithmic progression.

The Pull request message 30 may contain a variety of headers including a To header, an Action header, a MessageId header, and any other suitable header for a Pull request. The To and MessageID headers maybe similar to those described above with respect to the Get request. The Action header may indicate that the response is a Pull action, and may have the value: http://schemas.xmlsoap.org/ws/2004/04/enumeration/Pull and may be compliant with WS-Enumeration. The Action header may also include a mustUndersand field set to TRUE.

The <EnumerationContext> may be contained in a context header or in the body element of the SOAP request message. To communicate the <EnumerationContext>, the body may contain an EnumerationContext element, an optional MaxTimeElement, and optional MaxElements element, and/or a MaxCharacters element. The EnumerationContext element may contain a copy of the most recent context from the previous Enumerate Response or Pull Response. The Max-

```
(1)      <s:Envelope xmlns:S='http://www.w3.org/2003/05/soap-envelope'
(2)          xmlns:wxf='http://schemas.xmlsoap.org/ws/2004/04/enumeration'
(3)          xmlns:wsa='http://schemas.xmlsoap.org/ws/2004/03/addressing'>
(4)      <s:Header>
(5)          <wsa:From>
(6)              <wsa:Address> https://1.2.3.4/wsman </wsa:Address>
(7)          </wsa:From>
(8)          <wsa:Action>
(9)      http://schemas.xmlsoap.org/ws/2004/04/enumeration/EnumerateResponse
(10)         </wsa:Action>
(11)         <wsa:MessageID>
(12)             uuid:a7c5726b-de29-4313-b4d4-b3425b200831
(13)         </wsa:MessageID>
(14)         <wsa:RelatesTo>
(15)             uuid:e7c5726b-de29-4313-b4d4-b3425b200839
(16)         </wsa:RelatesTo>
(17)     </s:Header>
(18)     <s:Body>
(19)         <wsen:EnumerateResponse>
(20)             <wsen:EnumerationContext>
(21)                 123
(22)             </wsen:EnumerationContext>
(23)         </wsen:EnumerateResponse>
(24)     </s:Body>
(25)     </s:Envelope>
```

If the resource agent 16 cannot successfully enumerate the resource, the resource agent may send a suitable fault response. The fault response may indicate the reason why the resource agent cannot enumerate the new resource.

Pull Request and Response

As noted above, the contents of the enumeration indicated in an Enumeration response may be retrieved with a Pull request. Decoupling the Enumeration from the Pull operation may allow multiple enumerators of the same resource to be in different states and in different cursor positions. The client manager may continue to send Pull requests until no more results or until it decides to terminate the operation early with a Release request discussed further below. The Pull request may be formatted as a SOAP request and communicate the Time element may contain an indicator of the time that the client manager is willing to wait before receiving a response, whether or not the other batching parameters may have been satisfied. The MaxElements element may indicate the maximum number of elements that client manager wants to receive in the response. If this element is omitted, the resource agent may use any appropriate default, such as 1. The MaxCharacters element may indicate a further limitation to the maximum number of characters in the response. Since the response may be in UNICODE or ANSI, the number of octets may differ from the number of characters. This limit may take precedence over the MaxElements element. An example Pull request is shown below.

```
(33)    <?xml version="1.0"?>
(34)    <env:Envelope
(35)        xmlns:env="http://www.w3.org/2003/05/soap-envelope"
(36)        xmlns:wsman="http://schemas.xmlsoap.org/ws/2004/06/wsman"
(37)        xmlns:wsa="http://schemas.xmlsoap.org/ws/2003/03/addressing"
(38)        xmlns:wsen="http://schemas.xmlsoap.org/ws/2004/04/enumeration">
(39)    <env:Header>
(40)        <wsa:To env:mustUnderstand="true">
(41)            https://1.2.3.4/wsman
(42)        </wsa:To>
(43)
(44)     <wsa:Action env:mustUnderstand="true">
(45)            http://schemas.xmlsoap.org/ws/2004/04/enumeration/Pull
(46)     </wsa:Action>
(47)
(48)     <wsa:MessageID env:mustUnderstand="true">
(49)            uuid:d9726315-bc91-430b-9ed8-ce5ffb858a87
(50)     </wsa:MessageID>
(51)    </env:Header>
(52)
(53)    <env:Body>
(54)       <wsen:EnumerationContext>
(55)            123
(56)       </wsen:EnumerationContext>
(57)       <wsen:MaxTime> PT45S </wsen:MaxTime>
(58)       <wsen:MaxElements>100</wsen:MaxElements>
(59)       <wsen:MaxCharacters>8192</wsen:MaxCharacters>
(60)    </env:Body>
```

The information within the enumeration may be communicated to the client within the Pull response. The Pull response may include a From header, an Action header, a MessageID header, a RelatesTo header, and any other header suitable for a Pull response. The From, MessageID and RelatesTo headers may be similar to those described above with reference to the Get response. The Action header may indicate that the response is a Pull response, and may have the value: http://schemas.xmlsoap.org/ws/2004/04/enumeration/PullResponse and may be compliant with WS-Enumeration standards. The content from the enumeration may be communicated in the header and/or body element of the SOAP response 36. For example, the body element, may be used to communicate the most recent enumeration context, e.g., the cursor state for the next pull request, such as in a PullResponse wrapper. The Enumeration Context, e.g., identification for the enumeration, may be communicated in an EnumerationContext element or in any other suitable element. If the end of the enumeration has been reached, the Pull response may include an EndOfSequence element indicating that the end of the content of the enumeration. In some cases, if the EndOfSequence element is included, the enumeration context may not be included since no further Pull requests are suitable for that enumeration, e.g., the cursor state is at the end of the enumeration. An example, Pull response is shown below.

```
(1)     <s:Envelope xmlns:S='http://www.w3.org/2003/05/soap-envelope'
(2)         xmlns:wxf='http://schemas.xmlsoap.org/ws/2004/04/enumeration'
(3)         xmlns:wsa='http://schemas.xmlsoap.org/ws/2004/03/addressing'>
(4)     <s:Header>
(5)     <wsa:From>
(6)         <wsa:Address> https://1.2.3.4/wsman </wsa:Address>
(7)     </wsa:From>
(8)     <wsa:Action>
(9)  http://schemas.xmlsoap.org/ws/2004/04/enumeration/PullResponse
(10)    </wsa:Action>
(11)    <wsa:MessageID>
(12)         uuid:a7c5726b-de29-4313-b4d4-b3425b200831
(13)    </wsa:MessageID>
(14)    <wsa:RelatesTo>
(15)         uuid:e7c5726b-de29-4313-b4d4-b3425b200839
(16)    </wsa:RelatesTo>
(17)    </s:Header>
(18)    <s:Body>
(19)        <wsen:PullResponse>
(20)            <wsen:EnumerationContext>
(21)                 123
(22)            </wsen:EnumerationContext>
(23)        </wsen:EnumerateResponse>
(24)        <wsen:Items>
(25)            <Process xmlns="schemas.microsoft.com/2004/20/process">
(26)                <pid> 123 </pid>
(27)                <name> notepad </name>
```

```
(28)            </Process>
(29)            <Process xmlns="schemas.microsoft.com/2004/20/process">
(30)                <pid> 34 </pid>
(31)                <name> calc </name>
(32)            </Process>
(33)        </wsen:Items>
(34)        <wsen:EndOfSequence/>
(35)      </wsen:PullResponse>
(36)    </s:Body>
(37)  </s:Envelope>
```

The client may continue to attempt to continue with another Pull request using the most recently available context or may elect to terminate the operation using a Release request.

If the resource agent 16 cannot successfully provide result within the specified amount of time the resource agent may issue a fault response. The fault response may indicate the reason why the resource agent cannot pull content from the indicated enumeration.

Release Request and Response

The Release request may be used to terminate an enumeration that is still in progress. This message may only be desired if the client manager does not wish to continue enumerating using the Pull message. If the Pull messages reach the end of sequence of the enumeration, the release request may not be required. Allowing for release of an enumeration may allow resources to be released and reclaimed in the resource agent that were maintaining state data and the enumeration itself.

The Release request may be formatted as a SOAP request containing an enumeration identifier such as the most recent enumeration context. The resource agent may release the resources associated with the enumeration and return a Release response to indicate a successful release. If the context is invalid, the resource may return a fault response. If the resource agent does not maintain enumeration state information, for example it is using the enumeration context for this purpose, the resource agent may simply return a success release response without any actual analysis. In this manner, client managers for various resources of various capabilities may be coded to a consistent model.

The Release request SOAP message may include a header element to communicate the release information. For example, the Release message may include a To header, an Action header, a MessageID header, a Timeout Header, and any other header suitable for a Release message. The Release request may also include an EnumerationContext identifier which indicates the appropriate Enumeration to be released. The EnumerationContext may be communicated through the header element or through the body element. In the example illustrated below, the body element of the Release response contains the Enumeration Context to be released, which may be the most recent context available, either from the Pull response or the Enumerate response. An example Release request is shown below.

```
(1)   <s:Envelope xmlns:S='http://www.w3.org/2003/05/soap-envelope'
(2)       xmlns:wsa='http://schemas.xmlsoap.org/ws/2004/03/addressing'
(3)       xmlns:wsen='http://schemas.xmlsoap.org/ws/2004/04/enumeration'>
(4)     <s:Header>
(5)       <wsa:To>http://1.2.3.4/wsman</wsa:To>
(6)       <wsa:Action>
(7)           http://schemas.xmlsoap.org/ws/2004/04/enumeration/Release
(8)       </wsa:Action>
(9)       <wsa:MessageID>
(10)          uuid:e7c5726b-de29-4313-b4d4-b3425b200839
(11)      </wsa:MessageID>
(12)    </s:Header>
(13)
(14)    <s:Body>
(15)      <wsen:Release>
(16)          <wsen:EnumerationContext>123</wsen:EnumerationContext>
(17)      </wsen:Release>
(18)    <s/:Body>
(19)  </s:Envelope>
(20)
```

The To header, MessageId header, and Timeout header may be similar to those headers described above with reference to the Get request. The Action header may indicate that the request is a Release request action, and may have the constant value, such as http://schmemamlsoap.org/ws/2004/04/enumeration/Release. The Action header may also include a mustUnderstand field set to TRUE.

The resource agent may return a successful release response or fault message, as appropriate. The release response to a successful release of an enumeration may be formatted as a SOAP response message 36, and may include various information in the header element to communicate information to the client manager. For example, the Release SOAP response may include a From header, an Action header, a MessageID header, a RelatesTo header, and any other suitable header for a Release response. The body element of the Release response may be empty or may contain any other information suitable for a Release response. The From header, MessageID header, and RelatesTo header may be similar to those headers described above with reference to the Get response. The Action header may specify that the message is a Release response and may have a constant value, such as http://schemas.xmlsoap.org/ws/2004/04/enumeration/ReleaseResponse. The Action header may also set a mustUnderstand field to TRUE. An example Release response is shown below.

```
(1)   <s:Envelope xmlns:S='http://www.w3.org/2003/05/soap-envelope'
(2)        xmlns:wsen='http://schemas.xmlsoap.org/ws/2004/04/enumeration'
(3)        xmlns:wsa='http://schemas.xmlsoap.org/ws/2004/03/addressing'
(4)        >
(5)   <s:Header>
(6)        <wsa:From>
(7)            <wsa:Address> https://1.2.3.4/wsman </wsman:Address>
(8)        </wsa:From>
(9)        <wsa:Action>
(10)       http://schemas.xmlsoap.org/ws/2004/04/enumeration/ReleaseResponse
(11)       </wsa:Action>
(12)       <wsa:RelatesTo>
(13)           uuid:e7c5726b-de29-4313-b4d4-b3425b200839
(14)       </wsa:RelatesTo>
(15)       <wsa:MessageID>
(16)           uuid:f7c5726b-de29-4313-b4d4-b3425b200839
(17)       </wsa:MessageID>
(18)   </s:Header>
(19)   <s:Body />
(20)   </s:Envelope>
```

If the resource agent 16 cannot successfully release the indicated enumeration the resource agent may issue a fault response. The fault response may indicate the reason why the resource agent cannot release the indicated enumeration.

WSMAN-Shell Messages

A command shell resource may be any code which can execute a command-line expression such as a full shell implementation like the UNIX Korn Shell, or a simple dedicated processor which takes a single command without any switches (e.g., 'reset') including a C-language application (e.g., via argc argv[ ]) which supports a limited syntax and a single command. A system supporting a resource agent 16 may support one or more command shells or the same shell in many configurations, although each shell having a unique resource identifier. In some cases, a shell may accept an input stream as well as a command-line string. Shells may execute continuously, producing output as long as input is available, or may produce output until explicitly canceled. The client manager may create a shell using the OpenShell request or any other suitable request, may issue commands to the shell using a Command request and CommandIO request, and may close the shell when no more commands are needed using a CloseShell request or any other suitable request.

The shell may produce an output stream of results in any appropriate format including XML Infosets or CDATA. A stream is a set of results which have common semantics. The results stream may be in any suitable format including stdin, stdout, stderr, or any other suitable private stream which any naming scheme. Most result sets may belong to the stdout stream, which corresponds to stdout in traditional shell processors and ANSI C applications. The stdout stream may contain the primary output of the operation, and stderr may be used to communicate errors or status of the shell. However, it is to be appreciated that the stdout stream may be used communicate errors and/or status to the client manager. For example, if a shell processor executes a script, the output of that script, while possibly representing an error, may not represent an error or fault message to the resource agent. Accordingly, the error output from the script being handled by the shell processor may be placed in the stderr stream or stdout stream as appropriate.

An input stream to a shell may use the stdin stream. Since a resource agent may support more than one shell, a resource agent may provide responses, each responding with a different stream. Other streams may be used to indicate private shell processor status, supporting schemas, localization information, or other metadata incidental to the primary result set. Similarly, a resource agent may receive input from more than one stream. One example of a body element containing a stream response is shown below.

```
<env:Body>
    <wsman:Stream Name="stdout">
        <DiskInfo xmlns="microsoft.storage.disk/c:">
            <Drive> C: </Drive>
            <Freespace> 1023100 </Freespace>
        </DiskInfo>
        <DiskInfo xmlns="microsoft.storage.disk/c:">
            <Drive> D: </Drive>
            <Freespace> 87531000 </Freespace>
        </DiskInfo>
        <DiskInfo xmlns="microsoft.storage.disk/c:">
            <Drive> E: </Drive>
            <Freespace> 1133100 </Freespace>
        </DiskInfo>
    </wsman:Stream>
    <wsman:Stream Name="stderr">
        <ShellStatus xmlns="microsoft.os.shells/cmd.exe">
            <ReturnCode> 0 </ReturnCode>
        </ShellStatus>
    </wsman:Stream>
    <wsman:Stream Name="mystream">
    </wsman:Stream>
</env:Body>
```

In the above example, the stdout stream has three items and the std err stream has one item, and the mystream has zero items. The Stream element may wrap items for a specific stream and the Name attribute may indicate the stream name. the individual items within the stream may be juxtaposed. The same stream may occur one or multiple times within a message. The content of the Stream element may be a specific stream, a subset of an available stream or all streams, which may depend on the resource agent message standards and/or which streams are selected in the initial operation. The Stream wrapper may also include an End element which may indicate with a Boolean operator that there are no more items for this stream, although the stream itself may not be ended.

Alternatively the stream data may be simple text, so that CDATA or other suitable formats may be appropriate. CDATA may be wrapped in a CDATA wrapper element as appropriate.

OpenShell Request and Response

The OpenShell request may open or initialize a 'command shell' resource 18 indicated by the resource identifier of the SOAP message 30. When a shell is opened, the client manager may issue commands to the shell with subsequent Command requests, and then close the shell with a Close Shell request. The OpenShell request may also be used to open a stateless shell in order to get a context to that shell; and similarly, a CloseShell request may be sent, although, at a network level, the system would not actually take any action to close the shell. In this manner, the client manager may have consistent coding for different types of shell resources.

The OpenShell request may communicate the information to open the shell resource in the header element and/or body element. For example, an OpenShell request may contain a To header, a ResourceURI header, an Action header, a MessageID header, an optional Timeout header, an option Locale header, and any other suitable header for an OpenShell request. The To header, ResourceURI header, MessageID header, Timeout header and Locale header may be similar to those headers described above with reference to the Get request. The Action header may indicate that the request is an OpenShell request and may have a constant value such as http://schemas.xmlsoap.org/ws/2004/06/wsman/OpenShell and may be compliant with the protocol described herein. The Action header may also include a mustUnderstand attribute set equal to TRUE.

The body element of the OpenShell request may contain parameters or any other information required to initialize the shell to a running state. The body information may be wrapped in an OpenShell element to contain any information which will be literally passed to the shell processor in order to initialize it. The information may be any format such as specific XML content in any namespace, CDATA, or any other appropriate format. For example, the content of the information to initialize a shell may be a shell initializer; since the OpenShell element may be a generic wrapper, the initializer may define its own content and namespace. If the shell does not require additional information, the body element may be left empty. An example OpenShell request is illustrated below.

```
(1)   <?xml version="1.0"?>
(2)   <env:Envelope
(3)       xmlns:env="http://www.w3.org/2003/05/soap-envelope"
(4)       xmlns:wsman="http://schemas.xmlsoap.org/ws/2004/06/wsman"
(5)       xmlns:wsa="http://schemas.xmlsoap.org/ws/2003/03/addressing"
(6)
(7)       <env:Header>
(8)
(9)         <wsa:To>
(10)            http://1.2.3.4/wsman
(11)        </wsa:To>
(12)        <wsman:ResourceURI> wsman:microsoft.windows.os/shells/cmd
(13)        </wsman:ResourceURI>
(14)
(15)        <wsa:Action env:mustUnderstand="true">
(16)            http://schemas.xmlsoap.org/ws/2004/06/wsman/OpenShell
(17)        </wsa:Action>
(18)
(19)        <wsa:MessageId> uuid:f9726325-aa90-120b-6ed2-ae5ffb223a81
(20)        </wsa:MessageId>
(21)
(22)     </env:Header>
(23)
(24)     <env:Body>
(25)        <wsman:OpenShell>
(26)            <Cmd xlmns="http://schemas.microsoft.com/2004/06/sh/cmd">
(27)                set path=c:\temp
(28)            </Cmd>
(29)        </wsman:OpenShell>
(30)     </env:Body>
(31)   </env:Envelope>
(32)
```

When the resource agent 16 receives an OpenShell request 30, the resource agent may initialize the shell as indicated and send an OpenShell response 36 which contains a shell context object which can be used to execute commands. The OpenShell response may communicate the shell context object in any suitable manner and the response SOAP message may have any suitable header and/or body elements. For example, the OpenShell response may include a From header, an Action header, a MessageID header, a RelatesTo header, or any other suitable header for an OpenShell response. The From, MessageID, and RelatesTo headers may be similar to those described above with reference to the Get Response. The Action header may indicate that the message is an OpenShell response and may include a constant value such as http://schmeas.xmlsoap.org/ws/2004/06/wsman/OpenShell-Response and may be compliant the protocol described herein. The shell context may be communicated in the header or body element of the OpenShell response as appropriate to represent the instance of the running shell that was just created. The context may be used as an opaque item in following shell operations in order to refer to the shell that was just created. For example, the shell context may be wrapped in an OpenShellResponse wrapper and contained in a ShellContext element in the body element. The shell context may be in any suitable format to identify the shell including a valid XML content including a hexadecimal representation of an internal pointer maintained by the resource agent or a more complex representation with multiple XML elements. An example OpenShell response is illustrated below:

CloseShell request may communicate the information to close the shell in any suitable header element and/or body element. For example, a CloseShell request may include a To header, an Action header, a MessageID header, an optional Timeout header, or any other suitable header. The To header, MessageID header and Timeout header may be similar to those headers described above with reference to the Get request. The Action header may indicate that the desired action is a Close Shell operation and may be a constant such as http://schemas.xmlsoap.org/ws/2004/06/wsman/

```
(1)     <?xml version="1.0"?>
(2)     <env:Envelope
(3)             xmlns:env="http://www.w3.org/2003/05/soap-envelope"
(4)             xmlns:wsman="http://schemas.xmlsoap.org/ws/2004/06/wsman"
(5)             xmlns:wsa="http://schemas.xmlsoap.org/ws/2003/03/addressing"
(6)
(7)         <env:Header>
(8)
(9)             <wsa:From>
(10)                <wsa:Address> http://1.2.3.4/wsman </wsa:Address>
(11)            </wsa:From>
(12)
(13)            <wsa:Actionenv:mustUnderstand="true">
(14)                http://schemas.xmlsoap.org/ws/2004/06/wsman/OpenShellResponse
(15)            </wsa:Action>
(16)
(17)            <wsa:RelatesTo > uuid:d9726315-bc91-430b-9ed8-ce5ffb858a87
(18)            </wsa:RelatesTo>
(19)            <wsa:MessageId> uuid:f9726325-aa90-120b-6ed2-ae5ffb223a81
(20)            </wsa:MessageId>
(21)
(22)        </env:Header>
(23)
(24)        <env:Body>
(25)            <wsman:OpenShellResponse>
(26)                <wsman:ShellContext>
(27)                    0x500F0A00
(28)                </wsman:ShellContext>
(29)            </wsman:OpenShellResponse>
(30)        </env:Body>
(31)    </env:Envelope>
(32)
```

If the resource agent 16 cannot successfully open the indicated shell, the resource agent may issue a fault response. The fault response may indicate the reason why the resource agent cannot open the indicated shell.

CloseShell Request and Response

To close the shell, the client manager 12 may send a CloseShell request 30 to the resource agent 16. The CloseShell. The Action header may also include a mustUnderstand attribute which may be set to TRUE. The reference to the shell to be closed may be indicated in the header element or the body element. For example, the body element of the CloseShell request may contain a CloseShell element with a ShellContext attribute indicating the shell context, e.g., the shell context returned in the OpenShell response, to be closed. An example CloseShell request is illustrated below

```
(1)     <?xml version="1.0"?>
(2)     <env:Envelope
(3)             xmlns:env="http://www.w3.org/2003/05/soap-envelope"
(4)             xmlns:wsman="http://schemas.xmlsoap.org/ws/2004/06/wsman"
(5)             xmlns:wsa="http://schemas.xmlsoap.org/ws/2003/03/addressing"
(6)
(7)         <env:Header>
(8)
(9)             <wsa:To>
(10)                http://1.2.3.4/wsman
(11)            </wsa:To>
(12)
(13)            <wsa:Action env:mustUnderstand="true">
(14)                http://schemas.xmlsoap.org/ws/2004/06/wsman/CloseShell
(15)            </wsa:Action>
```

```
(16)
(17)     <wsa:MessageId> uuid:f9726325-aa90-120b-6ed2-ae5ffb223a81
(18)     </wsa:MessageId>
(19)
(20)   </env:Header>
(21)
(22)   <env:Body>
(23)       <wsman:CloseShell>
(24)           <wsman:ShellContext> 0x1400FEE </wsman:ShellContext>
(25)       </wsman:CloseShell>
(26)   </env:Body>
(27) </env:Envelope>
```

When a resource agent receives a CloseShell request, the resource agent may communicate with the indicated shell to close the shell, thus freeing any resources associated with the shell upon completion of the action. There may be no other retry or other recovery logic if this operation fails. The resource may send a successful close CloseShell SOAP response 36 to the client manager which may include the success indication in the header and/or body element as suitable.

For example, a CloseShell SOAP response 36 may include a From header, an Action header, a MessageID header, a RelatesTo header or any other header suitable for a CloseShell response. The From header, the MessageID header, and RelatesTo header may be similar to those headers described above with reference to the Get response. The Action header may contain a WS-Addressing Action URI which indicates that the message 36 is a CloseShell response and may be a constant value such as http://schemas.xmlsoap.org/ws/2004/06/wsman/CloseShellReponse and may be compliant with the protocol described herein. The Action header may also include a mustUnderstand attribute set to TRUE. The body of the CloseShell response may be empty if all appropriate information is communicated through the headers.

If the resource agent 16 cannot successfully close the indicated shell, the resource agent may issue a fault response. The fault response may indicate the reason why the resource agent cannot close the indicated shell.

ControlShell Request and Response

The ControlShell request may send a control code identified as a parameter 70 to the shell resource 18 indicated by the resource identifier of the SOAP message 30. The control code may be any suitable code such as an asynchronous control code. The control code may be used to cancel, pause, or resume currently executing commands, or to send other shell-specific or command-specific control codes. The ControlShell operator may be sent in a ControlShell SOAP request 30 from the client manager to the resource agent 16. The ControlShell request may be a SOAP message with any suitable header and/or body element as appropriate.

For example, the ControlShell request may include a To header, an Action header, a MessageID header, an Timeout header, or any other header suitable for a ControlShell request. The To header, the MessageID header, and Timeout header may be similar to those headers described above with reference to the Get request. The Action header may indicate that the requested action is a ControlShell operation and may be a constant value such as http://schemas.xmlsoap.org/ws/2004/06/wsman/ControlShell which may be compliant with the protocol described herein. The Action header may also include a mustUnderstand attribute which may be set equal to TRUE.

The context targeted for the operation may be indicated in a header element or in the body element. For example, the shell context and its associated operational control code may be communicated in the CloseShell request in a ControlShell element in the body element. For example, the control code may be included in a Code attribute of a ControlShell element of the body element. Suitable control codes may include break to indicate the shell should terminate any currently running command or commands and return to an idle state, pause may indicate that the shell should suspend any currently running command or commands and wait for further instructions, resume may indicate that the shell should resume execution if it was previously paused, or any other suitable user-defined control codes. An example ControlShell request is illustrated below.

```
(1)    <?xml version="1.0"?>
(2)    <env:Envelope
(3)            xmlns:env="http://www.w3.org/2003/05/soap-envelope"
(4)            xmlns:wsman="http://schemas.xmlsoap.org/ws/2004/06/wsman"
(5)            xmlns:wsa="http://schemas.xmlsoap.org/ws/2003/03/addressing"
(6)
(7)        <env:Header>
(8)
(9)            <wsa:To>
(10)               http://1.2.3.4/wsman
(11)           </wsa:To>
(12)
(13)           <wsman:ResourceURI> microsoft.windows.os.shell/cmd
(14)           </wsman:ResourceURI>
(15)
(16)           <wsa:Action env:mustUnderstand="true">
(17)               http://schemas.xmlsoap.org/ws/2004/06/wsman/ControlShell
```

```
-continued

(18)      </wsa:Action>
(19)
(20)      <wsa:MessageId> uuid:f9726325-aa90-120b-6ed2-ae5ffb223a81
(21)      </wsa:MessageId>
(22)
(23)      </env:Header>
(24)
(25)      <env:Body>
(26)          <wsman:ControlShell Code="wsman.shell.control/break">
(27)              <wsman:ShellContext> 0x1400FEE </wsman:ShellContext>
(28)          </wsman:ControlShell>
(29)      </env:Body>
(30)   </env:Envelope>
```

When the resource agent receives a ControlShell message, it may apply the indicated control code to the indicated resource, e.g., shell context. If the resource agent receives the control code (whether or not it successfully applies the control code), the resource agent may respond with a ControlShell SOAP response 36. The ControlShell response may communicate successful completion of the indicated control code in any suitable manner in the header and/or body element. For example, the ControlShell response may include a From header, an Action header, a MessageID header, a RelatesTo header, and any other suitable header for a ControlShell response. The From header, the MessageID header, and RelatesTo header may be similar to those headers described above with reference to the Get response. The Action header may indicate that the message is a ControlShell response and may include a constant value such as http://schema.xmlsoap.org/ws/2004/06/wsman/ControlshellResponse. The Action header may also include a mustUnderstand attribute which may be set equal to TRUE.

If the resource agent 16 is unable to apply the control code to the indicated resource and/or the control cope operation was unsuccessful, the resource agent may sent a fault response to the client manager. The fault response may indicate the reason why the resource agent cannot complete the control code operation.

Command and CommandIO Request and Response

The Command operation may execute a command identified within an open shell resource 18 identified in a Command SOAP message 30. If the command can be executed in a single call-return sequence, then a Command operation and its response may be the entire paradigm of running a command. If a command requires a long input stream or emits a very long output stream, the execution of the command may have to continued. Accordingly, a subsequent CommandIO operation may continue execution of a command within an open shell resource 18.

In operation, the client manager may issue a Command request to the resource agent 16, identifying the specific shell resource against which the identified command is to be executed. If there is any input stream data, a batch of input stream may be included in the initial message.

The Command request may communicate the shell resource and associated command to be executed in any suitable manner, such as in the header and/or body element of the SOAP request. For example, the Command request may include a To header, an Action header, a MessageID header, and any other header suitable for a Command request. The To header and the MessageID header may be similar to those headers described above with reference to the Get request. The Action header may indicate that the desired action is a Command request and may include a constant value such as http://schemas.xmlsoap.org/ws/204/06/wsman/Command. The Action header may also include a mustUnderstand attribute which may be set equal to TRUE. The body of the Command SOAP request may contain the reference to the shell context and the command, and any other input information needed to execute the command. The entire sequence may be wrapped in a wsman:Command element and contain the ShellContext obtained from the OpenShell response, and the CommandLine element may include the command line to be executed along with the information, such as XML mixed content (either text or embedded XML) needed to execute the command. The Command element may include other elements as appropriate, such as to control the batching logic in the response to the command request. For example, the body element may include a MaxElements to indicate the maximum number of items in the response to be provided by the shell through the resource agent; a MaxCharacters element may indicate the maximum SOAP message size of a response which may take precedence over the MaxElements indication; a MaxTime element may indicate the maximum time allowed before the resource agent should respond with the Command Result response message; and any other suitable parameter. If the MaxTime is set to zero, the resource agent may be allowed to respond only with results that it has cached and available, if any. An example, Command request is illustrated below.

```
(1)    <?xml version="1.0"?>
(2)    <env:Envelope
(3)        xmlns:env="http://www.w3.org/2003/05/soap-envelope"
(4)        xmlns:wsman="http://schemas.xmlsoap.org/ws/2004/06/wsman"
(5)        xmlns:wsa="http://schemas.xmlsoap.org/ws/2003/03/addressing"
(6)
(7)    <env:Header>
(8)
(9)        <wsa:To>
(10)            http://1.2.3.4/wsman
```

```
(11)        </wsa:To>
(12)
(13)        <wsa:Action env:mustUnderstand="true">
(14)            http://schemas.xmlsoap.org/ws/2004/06/wsman/Command
(15)        </wsa:Action>
(16)
(17)        <wsa:MessageId>
(18)            uuid:f9726325-aa90-120b-6ed2-ae5ffb223a81
(19)        </wsa:MessageId>
(20)    </env:Header>
(21)
(22)    <env:Body>
(23)        <wsman:Commmand>
(24)            <wsman:ShellContext>
(25)                0x140FE00
(26)            </wsman:ShellContext>
(27)            <wsman:MaxTime> PT30S </wsman:MaxTime>
(28)            <wsman:MaxElements> 1 </wsman:MaxElements>
(29)            <wsman:MaxCharacters> 65536 </wsman:MaxCharacters>
(30)            <wsman:CommandLine>
(31)                xcopy c:\temp\* c:\temp2 /s
(32)            </wsman:CommandLine>
(33)        </wsman:Command>
(34)    </env:Body>
(35) </env:Envelope>
(36)
```

Upon receipt of a Command request, the resource agent may communicate the identified command to the identifier shell resource, and forward the results of the command to the client manager 12 in a Command Result SOAP response. The Command Result response may contain the entire output of the command operation or no output if none available within the timeout period. If the Command Result response contains a Command Context object and a More Results element, then the client manager may begin repeated execution of the CommandIO requests and examine the command Result responses to see if it contains results or not. Any given response may contain a batch of command output or may indicate that no output was yet ready within the timeout period. Each time a CommandIO request is sent, it may contain the most recent CommandContext extracted from the previous Command Result message. The Command Context identifier, accordingly, acts as a 'cursor' to move through the results. If there is input data being streamed to the command, a batch may be bundled in the CommandIO request. After repeated CommandIO responses to retrieve command results, the client manager may receive a Command Result response with no context object and an EndOfStream block, indicating that results have been retrieved. If at any time a fault is received, the operation may be considered to be terminated and may not be restarted or continued. To abandon the operation before it is finished, a ControlShell request may be sent to the shell resource.

The Command Result response may include the information in the header and/or body element of the SOAP response as appropriate. For example, the Command Result response may include a From header, an Action header, a MessageID header, a RelatesTo header, and any other header suitable for a Command Result response. The From header, MessageID header, and RelatesTo header may be similar to those headers described above with respect to the Get response. The Action header may indicate that the message is a Command Request, and may include a constant value such as http://schemas.xmlsoap.org/ws/2004/06/wsman/CommandResult. The Action header may also include a mustUnderstand attribute which may be set equal to a value of TRUE. The results content may be communicated in the header element or in the body element. For example, the body element may contain the stream-encoded output of the shell resource as described above. If the entire result set is included in the response, then an EndOfStream element may conclude the stream data in the body element of the Command Result response message. If the result set is too large to fit into the Command Result response, then a Command context object may be provided, such as in a CommandContext element to indicate the 'location' to request the remaining results. This Command Context may then be extracted and placed in a following CommandIO request to retrieve the remaining results. The Command Context may be an opaque XML element which may be mixed content (text and/or XML) and may depend on the shell resource. An example Command Result response example follows.

```
(1)     [<?xml version="1.0"?>
(2)     <env:Envelope
(3)         xmlns:env="http://www.w3.org/2003/05/soap-envelope"
(4)         xmlns:wsman="http://schemas.xmlsoap.org/ws/2004/06/wsman"
(5)         xmlns:wsa="http://schemas.xmlsoap.org/ws/2003/03/addressing">
(6)
(7)     <env:Header>
(8)
(9)         <wsa:From>
```

-continued

```
(10)        <wsa:Address> http://1.2.3.4/wsman </wsa:Address>
(11)      </wsa:From>
(12)
(13)      <wsa:Action env:mustUnderstand="true">
(14)            http://schemas.xmlsoap.org/ws/2004/06/wsman/CommandResult
(15)      </wsa:Action>
(16)
(17)      <wsa:RelatesTo > uuid:d9726315-bc91-430b-9ed8-ce5ffb858a87
(18)      </wsa:RelatesTo>
(19)      <wsa:MessageId> uuid:f9726325-aa90-120b-6ed2-ae5ffb223a81
(20)      </wsa:MessageId>
(21)
(22)    </env:Header>
(23)
(24)    <env:Body>
(25)        <wsman:CommandResult>
(26)           <wsman:Stream Name="stdout">
(27)
(28)              <![CDATA[
(29)    02/03/2004 10:31 AM        35,328 wsman_delete.vsd
(30)    03/19/2004 09:58 AM        35,328 wsman_deliver.vsd
(31)    02/09/2004 12:16 PM        43,008 wsman_events_async_client.vsd
(32)    02/09/2004 12:17 PM        42,496 wsman_events_client_pull.vsd
(33)                 ]]>
(34)
(35)            </wsman:Stream>
(36)        </wsman:CommandResult>
(37)        <wsman:EndOfStreams/>
(38)    </env:Body>
(39)  </env:Envelope>
(40)
```

As noted above, the CommandIO request may be sent to request further results from an executed command. The CommandIO request may indicate the results to be retrieved in any suitable manner such as through the header and/or body element of the SOAP request message. For example, the CommandIO request may include a To header, an Action header, a MessageID header, and any other header suitable for a CommandIO request. The To and MessageID header may be similar to those headers described above with reference to the Get request. The Action header may indicate that the request is a CommandIO request and may include a constant value such as http://schemas.xmlsoap.org/ws/2004/06/wsman/CommandIO. The Action header may also include a mustUnderstand attribute which may be set equal to TRUE. The results to be retrieved may be indicated by the Command Context returned in a Command Results response. The Command Context may be included in the CommandIO request in the header or body element. For example, the body element may include a CommandIO element that contains a ShellContext element containing the Command Context. The CommandIO request may also contain a Shell Context indicator, e.g., retrieved from the OpenShell response, to indicate the target shell. The response to a CommandIO request is the same Command Result response described above.

If the resource agent is unable to retrieve results in response to the Command or CommandIO request, the resource agent may issue a suitable fault response. The fault response may indicate the reason why the resource agent cannot enumerate the new resource.

The end of all available streams may be indicated with an EndOfStream element, which may be part of the header element or body element of the Stream response in a Command or CommandIO Result response. The EndOfStream element may communicate the end of all input as well as the end of all output streams, and may occur simultaneously with actual content, but placed last in the response message. The Stream response may return an empty or null set with only the stream name and no items within the body element of the response message.

The order of elements in the body element of the stream response may be determined by the ordering of the stream. For example, if a response includes items from multiple streams, then the Stream response may indicate a stream shift with a wsman:Stream Name='stream' name' element.

Custom Requests and Responses

Other custom request messages may be sent with user-defined methods identified by a unique action indicator, such as a URI value. The custom request may include the WS-Addressing standard and contain a To header as described above, a MessageID header as described above, and a ResourceURI header to indicate the namespace of the custom method or action. The response to a custom request may also follow WS-Addressing standards and may include a From header, an Action header, a MessageID header, a RelatesTo header, and any other suitable header for a custom response. The From header, MessageID header, and RelatesTo header may similar to those headers described above with reference to the Get response. The Action header may indicate the response as a custom response to the custom request and may take a constant value such as http://schemas.xmlsoap.org/ws/2004/06/myoperationResponse. The Action header may also include a mustUnderstand attribute which may be set equal to TRUE. The body element may also be used to communicate other parameters or information for the custom operation.

WS-Eventing

The management system 10 may additionally or alternatively support event delivery, e.g., subscribing. For example, a client manager may initiate a subscription, but have the events sent to another client manager. In one example, the client manager may know which events it needs from one or more resource agents, but the resource agents know nothing about which events are needed. In another example, a resource agent may know which events are needed by a client manager, e.g., due to out-of-band operations) but these clients do not know which resource agents might provide these events. In yet another example, a client manager may know which events should be delivered from a resource agent to another client, but their the resource agent nor the other client manager are aware of the event. Moreover, one a subscription is established, there may be several methods for delivery. For example, the delivery of events may be point-to-point and reliable from the resource agent to the client manager, however, the resource agent connects to the client manager to deliver the event. In another example, the delivery of events may be point-to-point and reliable from the resource agent to the client manager, however, the client manager may periodically connect to the resource agent to 'poll' for events. In yet another example, the delivery of events may be broadcast to one or more client managers (e.g., traps) by the resource agent.

Subscribe Request and Response

The Subscribe request in a Subscribe request may subscribe to an event of a resource 18 indicated by the resource identifier of the Subscribe SOAP request 30. In this manner, the Subscribe operation may set up a subscription to events or other streaming telemetry from a 'stream' resource. Each stream of events may be a unique resource and have its own resource identifier. Unlike a query, e.g., Get, a subscription may continue to deliver results until it expires or the subscription is canceled through an Unsubscribe operation. Example event resources may include "Application Faults" which may send event each time an application raises a fault or crashes and an example stream resource may include a resource issuing events belonging to a single schema or to multiple schemas. The Renew operation may be used to renew an existing subscription so that the client manager 12 of FIG. 1 may continue to retrieve events from a subscription that would otherwise expire. To receive the event data retrieved by the subscription, a SOAP message 30 may include a EventBatch. In this manner, the Subscribe may set up the subscription and the EventBatch or Trap operation (described below) may send the event information to the client manager 12.

A Subscribe request may be a self-contained XML document which is an instruction to deliver events from one point to another. The Subscription request may be sent to a resource agent using a Subscribe SOAP request or out-of-band using local tools or utilities. Once active, the subscription is active, the resource agent may deliver events as specified in the subscription until it expires, too many errors occur in attempts to deliver, or faults are issued by the receiving client manager, the subscription is forcibly deactivated or canceled by a local tool or component, and/or an Unsubscribe request is executed by the resource agent. Prior to subscription expiration, a client manager may issue a Renew request to extend the expiration of the subscription to achieve uninterrupted delivery of events. Once a subscription is expired, the resource agent may send a final SubscriptionEnd response to the client manager to communicate that no more events will be arriving.

A Subscribe request may be used to create a subscription to a stream resource. A stream resource may produce a series of events at an unpredictable rate. A subscription is a limited time-ticket to receive these events or other XML-based telemetry from the stream (e.g., event source). The term stream is used herein since the source may not be actually emitting 'events' but may be some other type of stream data.

The Subscribe request may identify the desired channel, filter, and any other delivery parameters. The Subscribe request may also indicate a user-defined name for the subscription. Upon receipt of a Subscribe request, the resource agent may verify that it can support this type of delivery for that stream and may respond with a Subscribe response message 36 which contains the subscription identifier, which may be the same as or different from the user-requested subscription identifier. Other subscription parameters may also be present in the subscription response message, such as batching and latency, and any special scheduling request.

In some cases, the resource agent may begin sending events to the indicated receiver before the arrival of the Subscribe Response. Accordingly, the receiving client manager may be prepared to begin receiving events prior to sending the Subscribe request. If the subscription is accepted by the resource agent, local handler, and indicated resource, events 34 may begin to flow from the resource to the resource agent. The resource agent may store the events until delivery of those events is accomplished. The delivery may be synchronous or asynchronous. In synchronous delivery, the receiving client manager may ask for the events by polling the resource agent using a Pull request and/or an Enumerate request, both described above. In asynchronous delivery, the resource agent may 'push' the events or stream to the receiving client manager using an EventBatch or Trap message as events occur.

The Subscribe request may be, at least in part, based on the WS-Eventing standard. The subscription request may communicate the subscription information in the body and/or header element as appropriate. For example, the Subscription request may include a To header, an Action header, a MessageID header, a Timeout header, and any other header suitable for a Subscribe request. The To, MessageID, and Timeout headers may be similar to those described above with reference to the Get request. The Action header may indicate that the request is a Subscribe request and may include a constant value such as http://schemas.xmlsoap.org/ws/2004/01/eventing/Subscribe and may be compliant with WS-Eventing standards. The Action header may also include a mustUnderstand attribute which may be set equal to TRUE. The subscription instructions may be contained in the header and/or body element. For example, the subscription contents and definitions may be contained in the body element of the Subscribe request. In this manner, the subscription may be self-contained. The subscription contents may be wrapped in a Subscribe block in the body element. The Subscribe block may contain any suitable additional blocks, in any appropriate order, such as wse:Delivery, wse:NotifyTo, wsa:Address, wsa:ReferenceProperties, wse:Expires, wse:Filter, wsman:EventBatchMode, wsman:BatchSettings, wsman:BacklogCache, wsman:ResourceURI, wsman:Priority, wsman:Locale, wsman:DeliveryRetry, and any other suitable block to communicate subscription instructions. An example Subscribe request is illustrated below.

| | |
|---|---|
| (1) | <?xml version="1.0"?> |
| (2) | <env:Envelope |
| (3) | xmlns:env="http://www.w3.org/2003/05/soap-envelope" |
| (4) | xmlns:wsman="http://schemas.xmlsoap.org/ws/2004/06/wsman" |

-continued

```
(5)         xmlns:wsa="http://schemas.xmlsoap.org/ws/2003/03/addressing"
(6)         xmlns:wse="http://schemas.xmlsoap.org/ws/2004/01/eventing"
(7)
(8)         <env:Header>
(9)            <wsa:To env:mustUnderstand="true">
(10)              https://1.2.3.4/implementation
(11)           </wsa:To>
(12)           <wsa:Action env:mustUnderstand="true">
(13)              http://schemas.xmlsoap.org/ws/2004/01/eventing/Subscribe
(14)           </wsa:Action>
(15)           <wsa:MessageID env:mustUnderstand="true">
(16)              uuid:d9726315-bc91-430b-9ed8-ce5ffb858a87
(17)           </wsa:MessageID>
(18)           <wsman:Timeout> PT30S </wsman:Timeout>
(19)        </env:Header>
(20)
(21)        <env:Body>
(22)         <wse:Subscribe>
(23)          <wse:NotifyTo>
(24)              <wsa:Address> http://2.3.4.5/client </wsa:Address>
(25)              <wsa:ReferenceProperties>
(26)         <wse:ID>
(27)         uuid:1e64c926-4d52-486f-9bfa-b038f70c3097
(28)         </wse:ID>
    (9)              <wsman:ClientURI> /os/pid=122/8 </wsman:ClientURI>
                  </wsa:ReferenceProperties>
(29)         </wse:NotifyTo>
    (10)             <wse:Expires> PT50M </wsman:Expires>
    (11)             <wse:Filter dialect="http://www.w3.org/TR/1999/REC-xpath-
19991116">
(30)             Event[Id="120"]
(31)             </wsman:Filter>
    (12)             <wsman:ResourceURI>
(32)         microsoft.os.eventlog.application
(33)             </wsman:ResourceURI>
(34)
    (13)             <wsman:EventBatchyMode>
(35)         wsman:wsman.flag/DeliverWithAck
(36)             </wsman:EventBatchyMode>
                  </wse:Subscribe>
(37)         </env:Body>
(38)
(39)         </env:Envelope>
```

The NotifyTo block may indicate how the subscriber is to be reached. Since the requesting client manager may not be actually running at the time an event arrives, the NotifyTo may allow the resource agent to locate and route the event contents to the correct client processor when the event arrives. The NotifyTo block may include a wsa:Address block, a wsman:ID block, a wsman:ClientURI block and any other suitable block indicating message routing information. The Address block may contain the address of the client and may be compliant with WS-Addressing standards. The Address block may be left blank or filled in for reference and logging purposes. The ID block may be optional and may allow the requesting client manager to establish the subscription identifier rather than allowing the resource agent to select the subscription identifier. If specified in the ID block, the resource agent may accept the subscription identifier, may alter the subscription identifier, or may issue a fault message indicating that the requested subscription identifier is invalid. The ClientURI block may contain a client-defined URI which may be a pass-through context value. The resource agent may copy this given identifier into each event delivery to that the client can properly route the events. The subscribing client manager may define any number of optional XML values which are passed back to the client during delivery to help establish context.

The Expires block may indicate the duration or the date/time when the subscription will expire and may be compliant with WS-Eventing standards. The resource agent may send a fault response if the expiration time exceeds a predetermined threshold. If the value of the Expire block is omitted, the subscription may have a default expiration duration, such as a temporary duration equivalent to the lifetime of the network connection over which the Subscribe request is performed.

The Filter block may indicate a post-filter to be applied to each event in the stream before it is considered for delivery by the resource agent, and may be compliant with WS-Eventing standards. If the filter suppresses the event, the resource agent may discard the event and not deliver the event. The Filter block may include a Dialect attribute which may contain an indication of the language to use, and the content of the Filter element may be the filter expression, such as text, or embedded XML content.

The EventBatchMode block may contain an identifier, such as a URI, indicating the method of delivery. For example, wsman:wsman:.flag/DeliveryWithAck or any other suitable identifier may indicate that the resource agent, local handler, and/or resource itself will call the receiving client manager as the events occur using a EventBatchEvent response and that the receiving client manager must acknowledge each delivery. In another example, wsman:wsman.flag/DeliveryWithNoAck or any other suitable identifier, may indicate that the resource agent will call the receiving client manager as the events occur using an EventBatchEvent response, however, no acknowledgement is expected from the receiving client manager. In yet another example, wsman:wsman.flag/TrapWithNoAck or any other suitable identifier may indicate that the resource agent should deliver events as traps, e.g., broadcast, but no response is expected from the receiving client manager. In yet another example, wsman.wsman.flag/TrapWithAck or any other suitable identifier may indicate that the resource agent should deliver events as traps, e.g., broadcast, however, the trap should be acknowledged and 'cleared' by at least one receiving client manager, otherwise the resource agent may continue to send the trap. In another example, wsman.wsman.flag/DeliveryViaEnumeration or any other suitable identifier may indicate that the receiving client manager will poll for events periodically using an Enumeration request described above.

The BatchSettings block may indicate the expected size of the events to be returned in a single delivery. If omitted, the batch delivery may default to one event at a time. This block may not be compatible with trap-based deliveries, since traps may always default to being sent one at a time, e.g., when the event occurs. The batch settings may be communicated using any suitable attribute. For example, a maxKilobytes attribute may indicate the maximum number of kilobytes in the response packet. Accordingly, the resource agent should not exceed this total value with regard to the size of the result content when packing results in response messages. This value may be considered a hint or guideline, and may not include the size of the SOAP header or other overhead of the response message. This value may also be the primary guideline in determining the size of a delivery, although other size attributes may be met. For example, the batch settings may include a maxItems attribute indicating the maximum number of listing XML Infoset items in the response. Typically, this value is always observed. It may be legal for a response to contain fewer than this number of items, however, because the result might be the last batch or the size of the response may be constrained by the MaxKilobytes attribute. The batch settings may also include a maxLatency attribute which may indicate a duration or time before sending a response, in spite of any batching instructions. For example, some queries may be long-running and produce sporadic results. Accordingly, the maxLatency attribute may suggest to the resource agent that it is permissible to begin sending result when this time expires, even if the entire batch could not be filled. However, if a timeout fault occurs, a fault may be issued and the operation considered invalid. If the maxLatency value is less than an indicated Timeout value, the resource agent may be permitted to send a Result response containing zero items and for no fault message to be issued. The resource agent may verify that the maxLatency value does not exceed an indicated Timeout duration, and if so, the resource agent may send a fault message such as a wsman:wsman.fault/InvalidParameter fault message or any other suitable fault message.

The BacklogCache block may indicate the requested amount of backlog storage, e.g., memory or disk space, that the resource agent may use to store undelivered events before faulting or canceling the subscription. The BacklogCache value may be given in kilobyte or any other suitable unit. This attribute may be suitable with high-volume events in cases where the events are generated in bursts faster than they can be delivered or requested. If not specified, the resource identifier may implement its own default policy in this regard.

The ResourceURI block may indicate the stream resource 18 or sink URI.

The Priority block may indicate the priority of this subscription over other subscriptions. Lower priority subscriptions may then have delays in event delivery, or eve deleted, in deference to complying with higher priority subscriptions. The priority may be indicated with any suitable identifier, such as a low/medium/high or scale or range. For example, the priority may be indicated with a 1-10 scale with 10 being the lowest priority and 1 being the highest priority, such as system critical. A priority level of 5 may be a medium priority and may be a default priority. The resource agent may reserve the right to limit the number of subscriptions at each priority level.

The Locale block may indicate the locale of the client, such as by using an XML attribute. The attribute may be any suitable form such as a lang attribute which complies with ISO 639. the locale indicator may assist the resource agent in producing localized content for client managers. The locale indicator may be a request, and may not be complied with by the resource agent. The Locale block may also include a mustUnderstand attribute which can be set to either TRUE or FALSE or omitted.

The DeliveryRetry block may indicate a proposed action for the resource agent if a fault occurs during delivery. For example, the DeliveryRetry information may specify the maximum number of time or retry attempts to deliver the event response, and/or how far apart in time they should be spaced. If failure to deliver continues to occur, the resource agent may consider the subscription to be inactive and may delete the subscription and/or any stored events. If delivery is blocked, the BacklogCache attribute value may help the resource agent to determine how much buffering should occur. The DeliveryRetry block may contain a maxAttempts attribute or any other suitable attribute to indicate the maximum number of retries that should be attempted, and may contain an interval attribute or any other suitable attribute to indicate the duration time between retries.

Upon receipt of a Subscribe request message, the resource agent may create the subscription and send a SubscribeResponse to the client manager or send a fault message. A subscribe response may send the success indication in any suitable manner, such as through the header and/or body elements of the subscribe SOAP response. For example, the Subscribe response may include a From header, an Action header, a MessageId header, a RelatesTo header, and any other suitable header for a Subscribe response. The From, MessageID, and RelatesTo headers may be similar tot hose described above with reference to the Get response. The Action header may indicate that the response is a Subscribe response and may include a constant value such as http://schemas.xmlsoap.org/ws/2004/01/eventing/SubscribeResponse which may be compliant with WS-Eventing standards. The subscription information may be contained in a header and/or body element. For example, the body element may wrap the subscription information is a SubscribeResponse block and may include any suitable elements, such as an Id element, an Expires element, an EnumerationContext element, and any other suitable element. The Id element may identify the subscription and may be saved by the client manager to future use in a Renew and/or Unsubscribe request. The Expires element may indicate the expiration date of the subscription. If omitted in the response, the subscription may have a lifetime equivalent to the connection over which the Subscribe operation was performed. The EnumerationContext element may indicate the Enumeration Context for future Enumeration requests if enumeration was the requested delivery method for event information. An example Subscribe response is illustrated below.

Get request. The Action header may indicate that the request is an Unsubscribe request and may include a constant value such as http://schemas.xmlsoap.org/ws/2004/01/eventing/Unsubscribe which may be compliant with WS-Eventing standards. The Action header may also include a mustUnderstand attribute which may be set equal to TRUE. The subscription information may be communicated in the header and/or body elements of the Unsubscribe request. For example, the body element may wrap the subscription information in an Unsubscribe block with an ID element identifying the subscription to be canceled.

Upon receipt of an Unsubscribe request, the resource agent may look up the subscription, deactivate it, and send an Unsubscribe response. The resource agent may also send a SubscriptionEnd response as a final 'event' to the client manager receiving events from the subscription, and may use the delivery technique that was in force for that subscription. For example, if the events were delivered as a trap, then the SubscriptionEnd message may be delivered to the same addresses that the trap was being sent to. The Unsubscribe

```
<?xml version="1.0"?>
<env:Envelope
          xmlns:env="http://www.w3.org/2003/05/soap-envelope"
          xmlns:wsman="http://schemas.xmlsoap.org/ws/2004/06/wsman"
          xmlns:wsa="http://schemas.xmlsoap.org/ws/2003/03/addressing"
                    xmlns:wse="http://schemas.xmlsoap.org/ws/2004/01/eventing">
    <env:Header>
(1)       <wsa:From>
(2)           <wsa:Address> http://1.2.3.4/implementation </wsa:Address>
          </wsa:From>
(3)       <wsa:Action env:mustUnderstand="true">
http://schemas.xmlsoap.org/ws/2004/01/eventing/SubscribeResponse </wsa:Action>
(4)       <wsa:RelatesTo > uuid:d9726315-bc91-430b-9ed8-ce5ffb858a87
</wsa:RelatesTo>
(5)       <wsa:MessageId> uuid:f9726325-aa90-120b-6ed2-ae5ffb223a81
</wsa:MessageId>
(6)       <wsman:Status> wsman:wsman.status/OperationComplete </wsman:Status>
       </env:Header>
     <env:Body>
(7)        <wse:SubscribeResponse>
(8)           <wse:Id>uuid:5005cfe6-c2c6-4296-9c3a-80b9ad111813</wse:Id>
(9)           <wse:Expires>P0Y0M0DT30H0M0S</wse:Expires>
       </env:Body>
</env:Envelope>
```

Unsubscribe Request and Response

As noted above an Unsubscribe request may be sent by the client manager to deactivate and delete an active subscription. Accordingly, the indicated receiving client manager may no longer receive events and the subscription may be considered non-existent by the resource agent. It is to be appreciated that any client manager may send cancel a subscription, including the client manager which sent the original Subscribe response, the indicated receiving client manager, and/or any other authorized client manager.

The Unsubscribe request may identify the desired subscription to cancel and any other suitable information in the header and/or body elements of the SOAP request. For example, he Unsubscribe request may contain a To header, an Action header, a MessageID header, an optional Timeout header, and any other suitable header for an Unsubscribe request. The To, MessageID, and Timeout headers may be similar to those headers described above with reference to the response may indicate a successful cancellation of a subscription through the header and/or body element of the SOAP response.

For example, the Unsubscribe response may include a From header, an Action header, a MessageID header, a RelatesTo header, a Status header, and any other header suitable for an Unsubscribe response. The From header, MessageID header, and RelatesTo header may be similar to those headers described above with reference to the Get response. The Action header may indicate that the response is an Unsubscribe response and may include a constant value such as http://schemas.xmlsopa.org/ws/2004/01/eventing/UnsubscribeResponse which may be compliant with WS-Eventing standards. The Action header may also include a mustUnderstand attribute which may be set equal to TRUE. The Status header may indicate the final status of the operation, such as wsman:wsman.status/code, described further below, such as wsman:wsman.status/OperationsComplete, and that is not an error code. The subscription information may be communicated in the header and/or body element as appropriate. For example, the body element may wrap the subscription information in a SubscriptionEnd block which contains information about the subscription that was canceled. The SubscriptionEnd block may have any suitable elements such as a Id, Code and Reason. The Id element may indicate the identifier for the original subscription that is canceled, such as a UUID. The Code element may indicate the reason for the subscription cancellation such as wsman:wsman.status/Unsubscribe-Success and the Reason may be a text form the Code.

If the subscription cannot be found or canceled, a suitable fault response may be sent to the client manager which requested cancellation. The fault response may indicate the reason why the resource agent cannot cancel the subscription.

Renew Request and Response

The Renew request may be sent by a client manager to renew an existing, active subscription which may guarantee uninterrupted delivery. Since a resource agent may not be be compliant with WS-Eventing standards. The Action header may also include a mustUnderstand attribute which may be set equal to TRUE. The subscription information may be contained in the header and/or body elements as appropriate. For example, the body element may include a Renew block wrapping the subscription information which may include a new expiration and a subscription identification obtained from the Subscribe response. The new expiration may be duration relative to the current time or an absolute date and time. In some cases, the expiration may shorten the expiration duration or choose an earlier date/time of expiration if the first set time was too far into the future. The subscription identifier may be contained in an Id element and the expiration information may be contained in an Expires element in the body of the SOAP request. In some or all cases, none of the other subscription information may be changed in a Renew request. An example Renew request is illustrated below.

```
<?xml version="1.0"?>
<env:Envelope
        xmlns:env="http://www.w3.org/2003/05/soap-envelope"
        xmlns:wsman="http://schemas.xmlsoap.org/ws/2004/06/wsman"
        xmlns:wsa="http://schemas.xmlsoap.org/ws/2003/03/addressing"
        xmlns:wse="http://schemas.xmlsoap.org/ws/2004/01/eventing">
    <env:Header>
(1)     <wsa:To env:mustUnderstand="true">
            https://1.2.3.4/implementation
        </wsa:To>
(2)     <wsa:Action env:mustUnderstand="true">
            http://schemas.xmlsoap.org/ws/2004/01/eventing/Renew
        </wsa:Action>
(3)     <wsa:MessageID env:mustUnderstand="true">
            uuid:d9726315-bc91-430b-9ed8-ce5ffb858a87
        </wsa:MessageID>
(4)     <wsman:Timeout> PT30S </wsman:Timeout>
    </env:Header>
    <env:Body>
        <wse:Renew>
(5)         <wse:Id> uuid:1a62f8fb-1d21-4e15-8c3a-ca2c101f1b6d </wse:Id>
(6)         <wse:Expires> PT10H </wse:Expires>
        </wse:Renew>
    </env:Body>
</env:Envelope>
``` obliged to retain subscription information after the expiration time, a client manager may desire to track and/or renew subscriptions before they expire. If a renew subscription is processed after the subscription is expired, the resource agent may require a new subscription to be created.

The indication of the subscription to be removed and other information may be communicated to the resource agent in any suitable manner such as through the header and/or body elements of the Renew SOAP request. For example, the Renew request may include a To header, an Action header, a MessageId header, an optional Timeout header, and any other header suitable for a Renew request. The To header, MessageID header, and Timeout header may be similar to those headers described above with reference to the Get request. The Action header may indicate that the request is a Renew request and may include a constant such as http://schemas.xmlsoap.org/ws/2004/01/eventing/Renew which may Upon receipt of a Renew request, the resource agent may change the expiration date of an existing subscription and send a success Renew response to the client manager. In one example, the Renew response may include a From header, an Action header, a MessageID header, a RelatesTo header, a Status header, and any other suitable header for a Renew response. The From, MessageID, RelatesTo headers may be similar to those described above with reference to the Get response. The Action header may indicate that the response is a Renew response and may include a constant value such as http://shemas.xmlsoap.org/ws/2004/01/eventing/RenewResponse which may be compliant with WS-Eventing standards. The Action header may also include a mustUnderstand attribute which may be set equal to TRUE. The Status header may be similar to that described above with reference to the Unsubscribe response. An example Renew response is illustrated below.

```
<?xml version="1.0"?>
<env:Envelope
        xmlns:env="http://www.w3.org/2003/05/soap-envelope"
        xmlns:wsman="http://schemas.xmlsoap.org/ws/2004/06/wsman"
        xmlns:wsa="http://schemas.xmlsoap.org/ws/2003/03/addressing"
            xmlns:wse="http://schemas.xmlsoap.org/ws/2004/01/eventing">
  <env:Header>
(1)     <wsa:From>
(2)         <wsa:Address> http://1.2.3.4/implementation </wsa:Address>
            </wsa:From>
(3)     <wsa:Action env:mustUnderstand="true">
http://schemas.xmlsoap.org/ws/2004/01/eventing/RenewResponse </wsa:Action>
(4)     <wsa:RelatesTo > uuid:d9726315-bc91-430b-9ed8-ce5ffb858a87
</wsa:RelatesTo>
(5)        <wsa:MessageId> uuid:f9726325-aa90-120b-6ed2-ae5ffb223a81
</wsa:MessageId>
(6)        <wsman:Status> wsman:wsman.status/OperationComplete </wsman:Status>
        </env:Header>
     <env:Body>
(7)        <wse:RenewResponse>
(8)            <wse:Id>uuid:5005cfe6-c2c6-4296-9c3a-80b9ad111813</wse:Id>
(9)            <wse:Expires>P0Y0M0DT30H0M0S</wse:Expires>
(10)           <wse:SubscriberToken> uuid:1e64c926-4d52-486f-9bfa-b038f70c3097
</wse:SubscriberToken>
        </wse:RenewResponse>
      </env:Body>
</env:Envelope>
```

If the resource agent is unable to renew the subscription in response to the Renew request, the resource agent may issue a suitable fault response. The fault response may indicate the reason why the resource agent cannot renew the subscription.

SubscriptionEnd Request and Response

A SubscriptionEnd request may be sent by resource agent to notify the receiving client manager that a subscription has been canceled, e.g., the subscription may be expired. The resource agent may issue this message at any time if the subscription is canceled, e.g., by an out-of-band administrative operation. In some cases, it may be appropriate to refrain from sending the SubscriptionEnd message when the client manager sent an explicit Unsubscribe request, since as noted above, the SubscriptionEnd may be bundled in the body element in an Unsubscribe response. The SubscriptionEnd may be sent as the 'last' message to the receiving client manager in the event stream. Although it is to be appreciated that the client manager may acknowledge receipt of the SubscriptionEnd message with a SubscriptionEnd response, it may be appropriate for no response to be expected, and in some cases, the resource agent may be under no obligation to retry.

The SubscriptionEnd information may be contained in the message in any suitable manner such as in the header and/or body of the message. For example, the SubscriptionEnd message may include a To header, an Action header, a MessageID header, a SubscriptionEnd header, an Id header, a Code header, a Reason header, and any other header suitable for a SubscriptionEnd request. The To and MessageID headers may be similar to those headers described above with reference to the Get request. The Action header may indicate that the response is a SubscriptionEnd message and may include a constant value such as http://shemas.xmlsoap.org/ws/2004/01/eventing/SubscriptionEnd which may be compliant with WS-Eventing standards. The Action header may also include a mustUnderstand attribute which may be set equal to TRUE. The SubscriptionEnd header may include an XML wrapper to contain other subscription information. The ID header may contain a subscription identifier for the ended subscription. This value may be obtained from the original Subscribe request and/or response. The Code element may indicate the reason for the termination and the Reason may be a text form the Code and are also discussed further below. The reason codes indicating termination may be any suitable status code including wsman:wsman.status/UnsubscribeSuccess indicating a prior Unsubscribe request succeeded, wsman:wsman.status/ExpiredSubscription indicating that the subscription expires; wsman:wsman.status/AdministrativeChange indicating an outside administrative operation such as a deletion or configuration change which caused the subscription to be removed; wsman:wsman.status/AccessDenied indicating that a permission change has occurred and the receiving client manager is not longer authorized to receive events; wsman:wsman.status/LazySubscriber indicating that the subscribing client manager is not able to keep up with the flow of events; wsman:wsman.status/DeliveryRefused indicating that the receiving client manager refused delivery of the events; and any other suitable status and/or reason code. An example SubscriptionEnd example is illustrated below.

```
<?xml version="1.0"?>
<env:Envelope
        xmlns:env="http://www.w3.org/2003/05/soap-envelope"
        xmlns:wsman="http://schemas.xmlsoap.org/ws/2004/06/wsman"
        xmlns:wsa=http://schemas.xmlsoap.org/ws/2003/03/addressing
        xmlns:wse="http://schemas.xmlsoap.org/ws/2004/01/eventing">
    <env:Header>
❶    <wsa:To env:mustUnderstand="true"> https://1.2.3.4/implementation/
```

-continued

```
</wsa:To>
   ❷  <wsa:Action env:mustUnderstand="true">
"http://schemas.xmlsoap.org/ws/2004/01/eventing/SubscriptionEnd
</wsa:Action>
   ❸     <wsa:MessageId> uuid:f9726325-aa90-120b-6ed2-ae5ffb223a81 </wsa:MessageId>
      ❹        <wse:SubscriptionEnd>
      ❺            <wse:Id> uuid:1bea8201-041c-4dc2-8b00-89bf326950e3 </wse:Id>
      ❻            <wse:Code> wsman:wsman.status/LazySubscriber </wse:Code>
      ❼            <wse:Reason xml:lang="en-US">
                     Subscription ended because the subscriber could not keep up
with the event flow.
                 </wse:Reason>
         </wse:SubscriptionEnd>
             </env:Header>
   <env:Body>
   </env:Body>
</env:Envelope>
```

EventBatch Request and Response

To deliver events stored by the resource agent, the resource agent may send a EventBatchEvent request containing the requested batch event information, and the client manager may respond with an EventBatchEvent response indicating a successful delivery or fault message. The events stored in the resource agent may be the result of a manually set up subscription, a hard-wired subscription, and/or a subscription set up with a Subscribe request. The resource agent batches up the events, and based on the subscription parameters, delivers them to the client manager with the EventBatchEvent request.

The event information and other information of the EventBatchEvent request may be contained in the header and/or body element of the EventBatchEvent SOAP request. For example, the EventBatchEvent request may include a From header, an Action header, a MessageId header, a Sequence header, a Flags header, and any other header suitable for an EventBatchEvent request. The From header may indicate the resource agent which is sending the events to the receiving client manager, and may be compliant with the WS-Transfer standards. The From header may also identify the original request to which the EventBatchEvent message corresponds. The From header may also contain reference properties for the client to route the events, e.g., if they were requested in the subscribe request. The reference properties may be wrapped in a ReferenceProperties block and may include an Id element, a ClientURI element, and any other suitable element for reference properties. The Action header may indicate that the message is an EventBatchEvent message and may be a constant value such as wsman:operation/DeliverEvent. The Action header may also include a mustUnderstand attribute which may be set equal to TRUE. The Sequence header may contain information about which reply this is in the series, e.g., more than one event delivery may occur to send large batches of events, sporadic events, and the like. The Sequence indicator may be any appropriate indicator such as an integer increase by 1 with each EventBatchEvent message. The Flag header may indicate if the client manager needs to respond with an acknowledgement. For example, the Flag header may contain a wsman:wsman.flag/AcknowledgementRequired, and accordingly, the receiving client manager must reply with an EventBatchResponse including a Status element indicating a successful delivery, such as a wsman:wsman.status/Acknowledged element.

The EventBatchResponse may also include an Action header, a RelatesTo header, a MessageId header, a and any other header or element suitable for an EventBatchResponse response. An example EventBatchEvent message is illustrated below.

```
<?xml version="1.0"?>
   <env:Envelope
         xmlns:env="http://www.w3.org/2003/05/soap-envelope"
         xmlns:wsman="http://schemas.xmlsoap.org/ws/2004/06/wsman"
         xmlns:wsa="http://schemas.xmlsoap.org/ws/2003/03/addressing">
   <env:Header>
    <wsa:From>
         <wsa:Address> http://1.2.3.4/implementation </wsa:Address>
         <wsa:ReferenceProperties>
              <wse:Id> uuid:f9726325-aa90-120b-6ed2-ae5ffb223a81 </wse:Id>
              <wsman:ClientURI> ms.os.eventlog/application </wsman:ClientURI>
         </wsa:ReferenceProperties>
    </wsa:From>
    <wsa:Action env:mustUnderstand="true"> wsman:operation/DeliverEvent
    </wsa:Action>
         <wsa:MessageId> uuid:f 9726325-aa90-120b-6ed2-ae5f fb223a81
         </wsa:MessageId>
         <wsman:OperationID> </wsman:OperationID>
         <wsman:Sequence> 4 </wsman:Sequence>
   <env:Body>
         <DiskInfo xmlns="microsoft.storage.disk/c:">
              <Drive> C: </Drive>
              <Freespace> 1023100 </Freespace>
```

```
        </DiskInfo>
        <DiskInfo xmlns="microsoft.storage.disk/c:">
            <Drive> D: </Drive>
            <Freespace> 87531000 </Freespace>
        </DiskInfo>
        <DiskInfo xmlns="microsoft.storage.disk/c:">
            <Drive> E: </Drive>
            <Freespace> 1133100 </Freespace>
        </DiskInfo> </env:Body>
</env:Envelope>
```

Trap Message

The Trap message may deliver small datagram-based events from the resource agent to the client manager. In one suitable application, the Trap message may be used for monitoring or alerting purposes. The trapped events may be similar to SNMP 'Traps', however, the wsman:Trap may not be able to allow 'hard-coded' traps, such as if these are considered to be a security risk. To improve security, all traps may be required to have a known origin and be associated with controlled subscriptions and/or security parameters. Trapped events may be delivered to one or more client managers and may be sent over UDP or multicast transports and may have limited size, e.g., under 1500 octets, and may conform to the MTU of the networking hardware.

A trap message may be delivered with an indicator requiring that the client manager acknowledge receipt of the trap, or alternatively a trap message may sent without a requirement of an acknowledgement. The acknowledgement indicator may be any suitable indicator such as wsman:wsman.flag/ AckRequested. An acknowledgement of the trap message may be any suitable response, including a Get response or any other suitable response discussed above, containing an indication that the response is a reply to a prior trap message. The sender may then 'clear' the trap and discontinue resending the trap. If multiple receivers try to acknowledge the trap, the sender may allow this or alternatively, may fault the subsequent senders.

Typically, a trap may be an alert and may contain the actual event data. However, to accommodate a small size message format, the trap message may contain a location, such as a URI of the trap alert rather than the actual data for the item. The receiving client manager may then use the trap message location, e.g., URI, in a subsequent Get request or other operation to receive the details of the trap event.

A Trap message may be sent by a resource agent and/or by any client manager to one or more other client managers to alert interested parties in the trap event. The destination address of the trap message may be any suitable address and may be based on a formal Subscription request or may be hard-wired. The Trap message may be set up using any suitable binding, such as broadcast and/or multicast techniques under UDP binding, to one ore more recipient client managers.

Some transport bindings may be sensitive and/or vulnerable to security problems; accordingly, a trap may be quickly authenticated upon receipt so that the receiving client manager does not process a forged trap. To improve security, the trap message may support encryption of the datagram. Upon receipt, a suitable key, such as a symmetric key or private/ public key pair, maybe used to decrypt the datagram. In this manner, authentication may comprise decrypting the datagram and validating the format of the datagram.

In one example a Trap message may include a To header, a From header, an Action header, a MessageID header, a Flag header, a Replay header, and any other header suitable for a Trap message. The To and MessageID headers may be similar to those headers described above with reference to the Get request. The From header may be a wrapper which identifies the sender, e.g., a resource agent or client manager, and may be compliant with WS-Addressing standards. The From block may include an Address element, which may be compliant with WS-Addressing Standards. The From element may contain the address of the sender which may be used during the acknowledgment of the trap, if any. The From header may also include a ReferenceProperties block which may be a wrapper for any additional informational fields such as a ResourceURI element may include the resource indicator that should be accessed during an acknowledgement, an Id element may include a subscription identifier responsible for the trap being sent, a ClientURI element may include the client manager URI from the subscription for client-side cross-referencing purposes. The Action header may indicate that the message is a Trap message and may contain a constant value such as a URI which may be in one example wsman: wsman.operation/Trap. The Action header may also contain a mustUndersand attribute which may be set equal to TRUE. The Flag header may be optional and may be used to indicate that the Trap message should be acknowledged. For example, the Flag header may include an acknowledgement indicator such as wsman:wsman.flag/AckRequested. The Replay header, if present, may indicate the retry count for this trap. For example, he retry count may be 1 on the first broadcast, 2 on the second broadcast, and so on. The retry count may indicate to the receiving client manager that the trap is a replay of a prior trap. It is to be appreciated that the MessageID may remain constant even when the replay count is incremented and resent to the receiving client managers. The body element of the Trap message may contain any user defined data such as trap data or may be empty. An example Trap message is illustrated below.

```
<?xml version="1.0"?>
<env:Envelope
            xmlns:env="http://www.w3.org/2003/05/soap-envelope"
            xmlns:wsman="http://schemas.xmlsoap.org/ws/2004/06/wsman"
            xmlns:wsa="http://schemas.xmlsoap.org/ws/2003/03/addressing">
```

```
         <env:Header>
(1)        <wsa:From>
(2)           <wsa:Address>  1.2.3.4 </wsa:Address>
(3)           <wsa:ReferenceProperties>
                 <wsman:ResourceURI>
(4)                 wsman:microsoft.os.eventlog/application/1931
                 </wsman:ResourceURI>
              </wsa:ReferenceProperties>
           </wsa:From>
(5)        <wsa:Action env:mustUnderstand="true">
              wsman:wsman.operation/Trap
           </wsa:Action>
(6)        <wsa:MessageId>
              uuid:f9726325-aa90-120b-6ed2-ae5ffb223a81
           </wsa:MessageId>
(7)        <wsman:Replay> 1 </wsman:Replay>
(8)        <wsman:Flag> wsman:wsman.flag/AckRequested </wsman:Flag>
         </env:Header>
         <env:Body>
(9)        <DiskFull xmlns=http://schemas.microsoft.com/windows/os/diskfull">
              <Drive> c: </Drive>
           </DiskFull>
         </env:Body>
</env:Envelope>
```

If a response is requested in a Trap message, e.g., the wsman:wsman.flag/AckRequested flag is set, then a correlated response is required or the sender of the Trap message will continue to replay the Trap message. As noted above, any of the responses discussed above may be suitable such as the Get response, however, the response may include an additional TrapAck header to literally acknowledge the trap. A TrapAck header may contain the MessageID or other suitable identifier of the trap message being acknowledged.

Fault Responses

Various fault messages may be sent in response to any or some portion of the requests or other messages described above. The fault messages may indicate a failure to perform an action and/or understand a request.

An Access Denied fault response may indicate that the sending client manager is not permitted to access that indicated resource. The Access Denied fault response may be an appropriate response to any of the above described requests. The Access Denied fault response may include any appropriate indicator such as a header or body element which in one example may be wsman:wsman.fault/AccessDenied.

A Server Busy fault response may indicate that the server or other system supporting the resource agent may be servicing other requests and is unable to service the current request. The Server Busy fault response may be an appropriate response to any of the above described requests. The Server Busy fault response may include any appropriate indicator such as a header or body element which in one example may be wsman:wsman.fault/ServerBusy.

An Invalid Resource Identifier fault response may indicate that the indicated resource identifier, such as a URI, cannot be resolved into a local handler associated with a resource, which in one example may be that the indicated URI is not registered in the catalog data store. The Invalid Resource Identifier fault response may be an appropriate response to any of the above described requests. The Invalid Resource Identifier fault response may include any appropriate indicator such as a header or body element which in one example may be wsman:wsman.fault/InvalidResourceURI.

A Resource Not Found fault response may indicate that the indicated resource identifier, such as a URI, may be correctly formatted, but the specific resource identifier could not be resolved into a local handler associated with a resource, which in one example, the URI is not registered in the catalog data store. For example, resources may keys, e.g., wsman: >>> LogicalDisk?drive=Z:. So it may be possible, in some cases to have a valid resource to LogicalDisk, but if there is no Z: drive on the resource agent, then the resource may not be found. The Resource Not Found fault response may be an appropriate response to any of the above described requests. The Resource Not Found fault response may include any appropriate indicator such as a header or body element which in one example may be wsman:wsman.fault/ResourceNotFound.

An Unsupported Operation fault response may indicate that the indicated operation is not supported. The Unsupported Operation fault response may be an appropriate response to any of the above described requests. The Unsupported Operation fault response may include any appropriate indicator such as a header or body element which in one example may be wsman:wsman.fault/UnsupportedOperation.

An Unsupported Flag fault response may indicate that the indicated flag is not supported or the specified value is not supported. The Unsupported Flag fault response may be an appropriate response to any of the above described requests. The Unsupported Flag fault response may include any appropriate indicator such as a header or body element which in one example may be wsman:wsman.fault/UnsupportedFlag.

An Agent Internal fault response may indicate that the protocol request was valid but could not be serviced due to local system error. The fault response may also contain resource agent-specific diagnostics. The Agent Internal fault response may be an appropriate response to any of the above described requests. The Agent Internal fault response may include any appropriate indicator such as a header or body element which in one example may be wsman:wsman.fault/AgentInternal.

An Insufficient Resource fault response may indicate that the request was valid but there is not enough memory, disk space, or other required resources to process the request. The fault response may also contain resource agent-specific diagnostics. The Insufficient Resource fault response may be an appropriate response to any of the above described requests.

The Insufficient Resource fault response may include any appropriate indicator such as a header or body element which in one example may be wsman:wsman.fault/InsufficientResources.

A Quota Limit fault response may indicate that the request was valid but the requesting client manager or session has exceeded a quota limit on resources, elapsed time, or total operation count. The Quota Limit fault response may be an appropriate response to any of the above described requests. The Quota Limit fault response may include any appropriate indicator such as a header or body element which in one example may be wsman:wsman.fault/QuotaLimit.

An Invalid SOAP fault response may indicate that the resource agent has determined that the request does not conform to the specified protocol or any of its dependent specification. The Invalid SOAP fault response may be an appropriate response to any of the above described requests. The Invalid SOAP fault response may include any appropriate indicator such as a header or body element which in one example may be wsman:wsman.fault/InvalidSOAP.

An Invalid Subscription fault response may indicate that the indicated subscription request is not valid. The Invalid Subscription fault response may be an appropriate response to a Subscribe request. The Invalid Subscription fault response may include any appropriate indicator such as a header or body element which in one example may be wsman:wsman.fault/InvalidSubscribe.

A Not Renewable fault response may indicate that the indicated subscription request is not renewable. The Not Renewable fault response may be an appropriate response to a Renew request. The Not Renewable fault response may include any appropriate indicator such as a header or body element which in one example may be wsman:wsman.fault/NotRenewable.

A Subscription Not Found fault response may indicate that the indicated subscription resource cannot be found. The Subscription Not Found fault response may be an appropriate response to a Renew request and/or Unsubscribe request or any other suitable request. The Subscription Not Found fault response may include any appropriate indicator such as a header or body element which in one example may be wsman:wsman.fault/SubscriptionNotFound.

A Redirect fault response may indicate that the indicated sink resource is not accepting the delivery and is recommending an alternate destination. The alternate destination may be indicated in the Redirect fault response header and/or body element as appropriate. The Redirect fault response may be an appropriate response to an EventBatch request or any other suitable request. The Redirect fault response may include any appropriate indicator such as a header or body element which in one example may be wsman:wsman.fault/Redirect.

An Invalid Stream fault response may indicate that the indicated input stream is not valid for the specified shell command or method. The Invalid Stream fault response may be an appropriate response to a Command request, or any other suitable request. The Invalid Stream fault response may include any appropriate indicator such as a header or body element which in one example may be wsman:wsman.fault/InvalidStream.

An Invalid Parameters fault response may indicate that one or more input parameters were not valid. The fault may also contain specific pointer to the offending values. The Invalid Parameters fault response may be an appropriate response to any of the above described requests. The Invalid Parameters fault response may include any appropriate indicator such as a header or body element which in one example may be wsman:wsman.fault/InvalidParameters.

A Cancellation Too Late fault response may indicate that the cancellation of an action arrived too late to stop the operation. The Invalid Parameters fault response may be an appropriate response to any of the above described requests. The Cancellation Too Late fault response may include any appropriate indicator such as a header or body element which in one example may be wsman:wsman.fault/CancellationTooLate.

An Operation Not Found fault response may indicate that the resource agent cannot identity the operation to which the control code applies. The Operation Not Found fault response may be an appropriate response to a Control request, or any other suitable request. The Operation Not Found fault response may include any appropriate indicator such as a header or body element which in one example may be wsman:wsman.fault/OperationNotFound.

An Agent Offline fault response may indicate that the resource agent has been disabled except for the ability to respond with the fault message. The Agent Offline fault response may allow a ping of offline/suspended agents. The Agent Offline fault response may be an appropriate response to any of the above described requests. The Agent Offline fault response may include any appropriate indicator such as a header or body element which in one example may be wsman:wsman.fault/AgentOffline.

A Cancelled fault response may indicate that the operation was cancelled, either by the resource agent or by an explicit Control operation. The Cancelled fault response may be an appropriate response to any of the above described requests. The Cancelled fault response may include any appropriate indicator such as a header or body element which in one example may be wsman:wsman.fault/Cancelled.

An Access Conflict fault response may indicate that the resource is in use and the operation would result in a conflict. For example, a Delete request might fail in this case. The Access Conflict fault response may be an appropriate response to any of the above described requests. The Access Conflict fault response may include any appropriate indicator such as a header or body element which in one example may be wsman:wsman.fault/AccessConflict.

An Output Backlog fault response may indicate that the output results are not being retrieved quickly enough to continue. The Output Backlog fault response may be an appropriate response to a Subscribe request such as a Pull Events request, or any other suitable request. The Output Backlog fault response may include any appropriate indicator such as a header or body element which in one example may be wsman:wsman.fault/OutputBacklog.

An Input Stream Required fault response may indicate that the indicated command requires an input stream and no input stream was supplied or indicated. The Input Stream Required fault response may be an appropriate response to an OpenShell request, or any other suitable request. The Input Stream Required fault response may include any appropriate indicator such as a header or body element which in one example may be wsman:wsman.fault/InputStreamRequired.

A Timeout fault response may be sent if the resource agent could not respond to the request within the specified time. The Timeout fault response may be an appropriate response to any of the above described requests, or any other suitable request. The Timeout fault response may include any appropriate indicator such as a header or body element which in one example may be wsman:wsman.fault/Timeout. If a Timeout response is received in reply to a Release request, the state of the enumerator may be undefined, and the client manager may be directed to cease further release operations.

An Invalid Representation fault response may indicate that the specified value, e.g., XML in the body of the SOAP put request, may not be valid for the indicated resource. The Invalid Representation fault response may be an appropriate response to the Put request, Create request, or any other suitable request. The Invalid Representation fault response may include any appropriate indicator such as a header or body element which in one example may be wsman:wsman.fault/InvalidRepresentation.

An Already Exists fault response may indicate that a resource already exists and cannot be created. The Already Exists fault response may be an appropriate response to the Create request, or any other suitable request. The Already Exists fault response may include any appropriate indicator such as a header or body element which in one example may be wsman:wsman.fault/AlreadyExists.

An Invalid Context fault response may indicate that the specified Enumerator Context is not valid for a pull operation. The Invalid Context fault response may be an appropriate response to the Enumerator request, Release request, a CloseShell request, a ControlShell request, or any other suitable request. The Invalid Context fault response may include any appropriate indicator such as a header or body element which in one example may be wsman:wsman.fault/InvalidContext. If an Invalid Context fault is received in reply to a Release request, the release action did not occur and may be considered still active.

An Invalid Resource Type fault response may indicate that the specified resource is not a valid resource. The Invalid Resource Type fault response may be an appropriate response to the OpenShell request, or any other suitable request. The Invalid Resource Type fault response may include any appropriate indicator such as a header or body element which in one example may be wsman:wsman.fault/InvalidResourceType.

An Initialization Error fault response may indicate that the specified shell failed during initialization. The Initialization Error fault response may be an appropriate response to the OpenShell request, or any other suitable request. The Initialization Error fault response may include any appropriate indicator such as a header or body element which in one example may be wsman:wsman.fault/InitializationError.

An Invalid Control Code fault response may indicate that the specified control code is not supported or recognized. The Invalid Control Code fault response may be an appropriate response to the ControlShell request, or any other suitable request. The Invalid Control Code fault response may include any appropriate indicator such as a header or body element which in one example may be wsman:wsman.fault/InvalidControlCode.

Each fault response may have a similar construct. For example, each fault message may include an Action header indicating that the response is a fault response, a MessageId header indicating the unique MessageID, and a RelatesTo header which indicates the request to which the fault response relates. The fault and/or error indication, such those described above, may be included in an appropriate header and/or body element of the SOAP response. For example, all error content may be included in the body element of the fault response and wrapped in the blocks described above. The body content may also include a user-friendly message which is localized, and may be dependent on the indicated Locale from the request message. The body element may also include agent-specific body content and/or other fault codes from other schemas. Agent-specific content may include diagnostic information which add more detail to the fault message, identification information regarding what handler, provider, or other supported code was executing at the time of the fault, what role such code was executing in, and/or specific error information from those components.

To implement diagnostic information into the fault message body element, the resource agent designer may devise a URI hierarchy to describe the underlying supporting components, such as device drivers, handlers, providers, requesters, and the like. Each such component may have an assigned URI which is specific to the resource agent's architecture. The resource agent designer may determine what role these nodes play when servicing a request. A role may be a generic concept and may not apply to a given resource agent architecture. A role can have many definition, but often a task-based role concept may be appropriate. Knowing that the request was part of the 'Backup' task can help in diagnosis and statistical analysis of failures. A URI for each role may be devised to implement the roles in the system manager. The node and Role URIs may be optional content in the fault response. Additional agent-specific error content can be added to the fault message content. The format of this additional data may be agent-specific and non-generic. For example, a namespace may be defined for the agent-specific content, and a generic schema may be provided such as

```
<wsman:Fault xmlns=http://schemas.wsman.org/2004/01/genericFault>
    <ErrorCode> 1202 </ErrorCode>
    <Publisher> Microsoft.SqlServer </Publisher>
        <Message> Insufficient Temporary Disk Space </Message>
```

Status Codes

The above described requests and responses may provide one or more status codes that are compliant with a specified protocol. The status code may be communicated in the header and/or body element as appropriate.

For example, a No Error status code may indicate that the operation was successful and is not complete and may be indicated with any suitable identifier or code such as wsman:wsman.status/NoError. The No Error status code may be appropriate in any response.

A Pending status code may indicate that the operation is in progress and may be indicated with any suitable identifier or code such as wsman:wsman.status/Pending. The Pending status code may be appropriate in any response.

A More Results status code may indicate that the client manager should send a request since more results are available, and may be indicated with any suitable identifier or code such as wsman:wsman.status/MoreResults. The More Results status code may be appropriate in any response to an Enumerate, invoking a custom request, Command, and/or CommandIO request or any other suitable response.

A Waiting For Input status code may indicate that the resource agent requires more input to continue processing the command, and may be indicated with any suitable identifier or code such as wsman:wsman.status/WaitingForInput. The Waiting For Input status code may be appropriate in any response to a CommandIO and/or Command request or any other suitable response.

A No More Results status code may indicate that the resource agent does not have any results available and the client manager should no longer call the CommandIO, and may be indicated with any suitable identifier or code such as wsman:wsman.status/NoMoreResults. The No More Results status code may be appropriate in any response to a CommandIO, Command, Enumerate request or any other suitable response.

A Limited Service status code may indicate that the result succeeded, but due to limited service availability, the result is only a summary or missing expensive data items, and may be indicated with any suitable identifier or code such as wsman:wsman.status/LimitedService. The Limited Service status code may be appropriate in any response.

A Client Too Fast status code may indicate that the resource agent is nearing its load limit and suggests that the requests be sent in at a lower rate, and may be indicated with any suitable identifier or code such as wsman:wsman.status/ClientTooFast. The Client Too Fast status code may be appropriate in any response.

A Client Too Slow status code may indicate that the client manager is not retrieving its results fast enough and risks receiving a fault instead of the nest result set, and may be indicated with any suitable identifier or code such as wsman:wsman.status/ClientTooSlow. The Client Too Slow status code may be appropriate in any response to a CommandIO request or any other suitable response.

Figure 5:
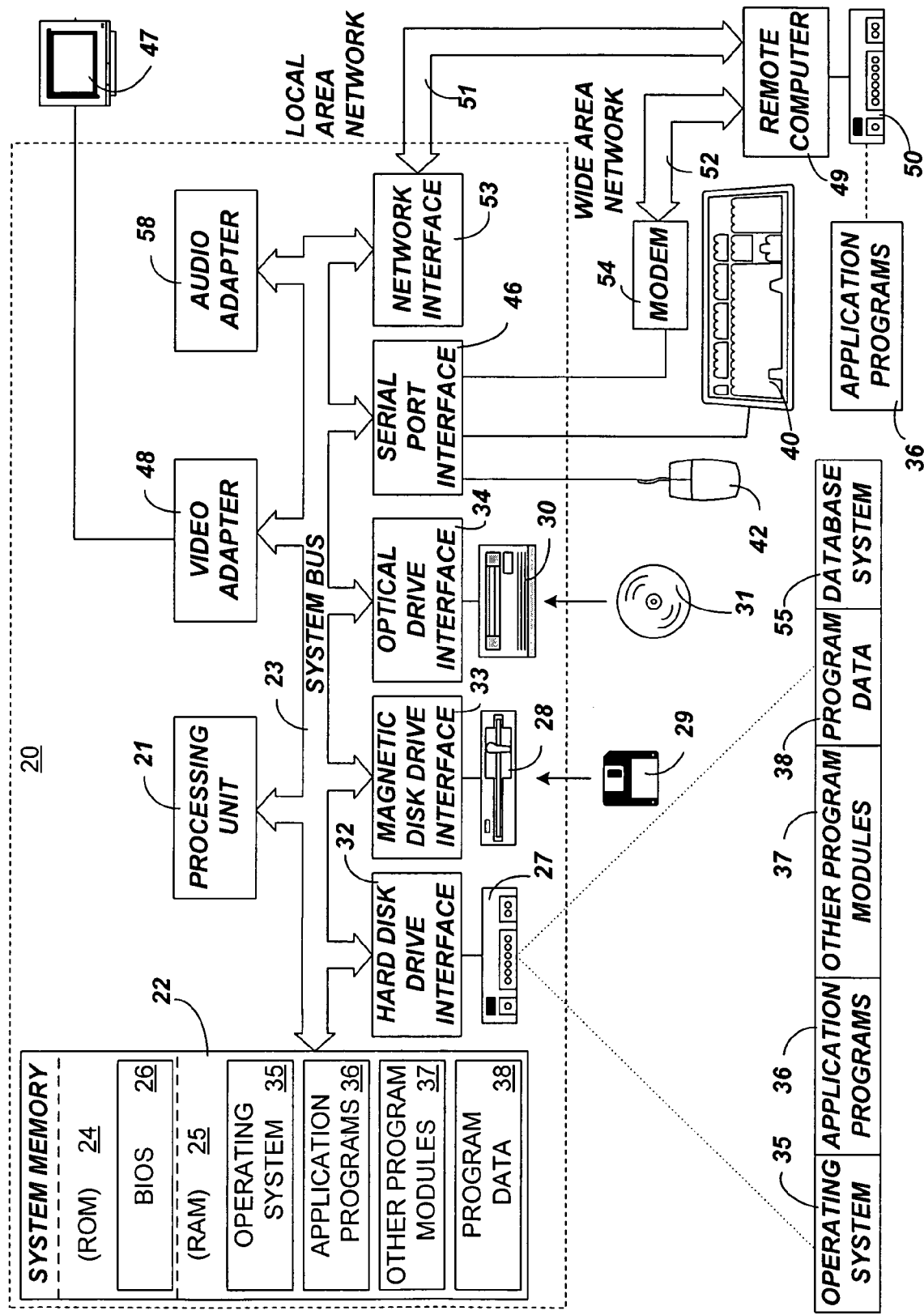
FIG. 5 is an example schematic diagram of an example computer system in one embodiment.

FIG. 5 illustrates an example of a suitable computing system environment 900 on which any combination of the client manager, resource agent, catalog data store, local handler, and resource of the management system 10 may be implemented. The computing system environment 900 is only one example of a suitable computing environment and is not intended to suggest any limitation as to the scope of use or functionality of the management system 100. Neither should the computing environment 900 be interpreted as having any dependency or requirement relating to any one or combination of components illustrated in the exemplary operating environment 900.

The management system 100 is operational with numerous other general purpose or special purpose computing system environments or configurations. Examples of well known computing systems, environments, and/or configurations that may be suitable for use with the management system 100 include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The management system 10 may be described in the general context of computer-executable instructions, such as program modules, being executed by a computer. Generally, program modules include routines, programs, objects, components, data structures, etc. that perform particular tasks or implement particular abstract data types. The management system 10 may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the management system 100 includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 5 illustrates operating system 934, application programs 935, other program modules 936, and program data 937.

The computer 910 may also include other removable/non-removable, volatile/nonvolatile computer storage media. By way of example only, FIG. 5 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 85 provide storage of computer readable instructions, data structures, program modules and other data for the computer 910. In FIG. 5, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 8. The logical connections depicted in FIG. 8 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 5 illustrates remote application programs 985 as residing on memory device 981. It will be appreciated that the network connections shown are exemplary and other means of establishing a communications link between the computers may be used.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A computer storage medium having computer executable instructions for performing steps comprising:
   (a) receiving from a sending device at a receiving device a first Simple Object Accessing Protocol (SOAP) message comprising a first operation identifier for accessing instrumentation information and a first resource identifier associated with a first computer system resource;
   (b) resolving the first resource identifier into an address for a local handler associated with the first resource;
   (c) sending a local request to the local handler at the resolved address;
   (d) determining a timeout period for the first Simple Object Accessing Protocol message, the timeout period being a published default timeout period, the timeout period not being part of the first Simple Object Accessing Protocol message, determining the timeout period including requesting the published timeout period from a publishing device, the publishing device being different from the sending device and the receiving device; and
   (e) when the receiving device cannot comply with the timeout period, sending an Unsupported Timeout message to the sending device.

2. The computer storage medium of claim 1, wherein the first resource identifier includes a Uniform Resource Identifier.

3. The computer storage medium of claim 1, wherein the first resource identifier includes a CIM.

4. The computer storage medium of claim 1, further comprising determining a schema for communicating with the local handler, and generating the local request from the SOAP message and the accessed schema.

5. The computer storage medium of claim 1, further comprising receiving the instrumentation information from the local handler, and sending to a client manager a SOAP response comprising the instrumentation information.

6. The computer storage medium of claim 1, further comprising authenticating the first SOAP message using hypertext transport protocol secure (HTTPS).

7. The computer storage medium of claim 1, wherein the first operation identifier includes at least one of a group consisting of a get identifier, a put identifier, a create resource identifier, a delete resource identifier, an enumerate identifier, a pull identifier, a release identifier, an open shell identifier, a close shell identifier, a control shell identifier, a command result identifier, a subscribe identifier, an unsubscribe identifier, a renew subscription identifier, a event batch identifier, and a trap identifier.

8. The computer storage medium of claim 1, further comprising receiving a second SOAP message comprising a second operation identifier for accessing instrumentation information and a second resource identifier associated with a second computer system resource, wherein the first operation identifier includes at least one of the a group consisting of a get request, a put request, a delete request, and a create request, and the second operation identifier includes at least one of a group consisting of a subscribe identifier, an unsubscribe identifier, an event batch identifier, and a trap identifier.

9. The computer storage medium of claim 8, further comprising authenticating the first SOAP message and the second SOAP message with a consistent authentication scheme.

10. A computer storage medium having computer executable instructions for performing steps comprising:
 (a) sending from a client manager to a resource agent a first Simple Object Accessing Protocol (SOAP) request comprising an first operation identifier for retrieving instrumentation information and a resource identifier indicating a resource that is the source of the instrumentation information;
 (b) receiving at the client manager a first SOAP response comprising a first value of the instrumentation information of the resource;
 (c) sending from the client manager a second SOAP request comprising a second operation identifier for correcting instrumentation information, the resource identifier, and a second value of the instrumentation information, the second SOAP request requesting that the first value be replaced by the second value in the resource associated with the resource identifier; and
 (d) receiving at the client manager a second SOAP response, the second SOAP response being in response to the second SOAP request and indicating that the first value has been replaced by a third value instead of the second value in the resource associated with the resource identifier, the third value being different from the second value.

11. The computer storage medium of claim 10, further comprising receiving a second SOAP response verifying that the first value has been replaced by the second value in the resource associated with the resource identifier.

12. The computer storage medium of claim 10, wherein the resource identifier includes a uniform resource identifier (URI).

13. The computer storage medium of claim 10, wherein the first value is a singleton value.

14. The computer storage medium of claim 10, wherein the first value is an enumeration sequence.

15. The computer storage medium of claim 10, wherein the first operation identifier includes a namespace of a governing standard and a name of the operation.

16. The computer storage medium of claim 10, further comprising determining the type of instrumentation information of the second value.

17. The computer storage medium of claim 10, further comprising sending a fault response if the type of instrumentation information is not read-write accessible.

18. A computer storage medium having computer executable instructions for performing steps comprising:
 (a) receiving a request message comprising an operation identifier for accessing instrumentation information, an address of a resource agent, and a uniform resource identifier identifying a computer system resource associated with the resource agent;
 (b) resolving the uniform resource identifier into an address for a local handler associated with the resource;
 (c) sending a local request to the local handler at the resolved address;
 (d) receiving resource instrumentation information;
 (e) determining based on a maximum time value in the request message, the maximum time value indicating a maximum time and not a set of requested information whether the maximum time for the resource agent to respond is zero; and
 (f) sending, in response to the local request, only cached results in response to determining the maximum time for the resource agent to respond is zero.

* * * * *